(12) United States Patent
Arai et al.

(10) Patent No.: US 9,112,658 B2
(45) Date of Patent: Aug. 18, 2015

(54) BASE STATION, USER TERMINAL, AND COMMUNICATION METHOD

(75) Inventors: Kenji Arai, Yokohama (JP); Takashi Fujita, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 612 days.

(21) Appl. No.: 13/434,732

(22) Filed: Mar. 29, 2012

(65) Prior Publication Data

US 2012/0300751 A1 Nov. 29, 2012

(30) Foreign Application Priority Data

May 25, 2011 (JP) ................. 2011-117288

(51) Int. Cl.
*H04L 5/00* (2006.01)
*H04L 1/00* (2006.01)
*H04L 1/18* (2006.01)
*H04L 1/16* (2006.01)
*H04W 88/08* (2009.01)

(52) U.S. Cl.
CPC ............ *H04L 5/0053* (2013.01); *H04L 1/0026* (2013.01); *H04L 1/1867* (2013.01); *H04L 1/1671* (2013.01); *H04W 88/08* (2013.01)

(58) Field of Classification Search
None
See application file for complete search history.

(56) References Cited

U.S. PATENT DOCUMENTS

| | | | |
|---|---|---|---|
| 8,462,715 B2 * | 6/2013 | Shimomura | 370/329 |
| 2010/0091725 A1 | 4/2010 | Ishii | |
| 2010/0091726 A1 | 4/2010 | Ishii et al. | |
| 2010/0091727 A1 | 4/2010 | Ishii | |
| 2010/0098008 A1 | 4/2010 | Ishii et al. | |
| 2010/0099429 A1 | 4/2010 | Ishii et al. | |
| 2010/0111008 A1 | 5/2010 | Ishii | |
| 2010/0118789 A1 * | 5/2010 | Shimomura | 370/328 |
| 2010/0150085 A1 | 6/2010 | Ishii et al. | |
| 2010/0150086 A1 * | 6/2010 | Harada et al. | 370/329 |
| 2012/0044898 A1 * | 2/2012 | Ishii | 370/329 |
| 2012/0099527 A1 * | 4/2012 | Ishii | 370/328 |
| 2012/0257513 A1 * | 10/2012 | Yamada | 370/248 |
| 2012/0257569 A1 * | 10/2012 | Jang et al. | 370/328 |
| 2013/0028207 A1 * | 1/2013 | Okubo et al. | 370/329 |
| 2013/0114572 A1 * | 5/2013 | Fong et al. | 370/336 |
| 2013/0201910 A1 * | 8/2013 | Bergstrom et al. | 370/328 |
| 2014/0105169 A1 * | 4/2014 | Chang et al. | 370/329 |
| 2014/0185595 A1 * | 7/2014 | Wu et al. | 370/336 |

FOREIGN PATENT DOCUMENTS

| | | |
|---|---|---|
| JP | 2008-108222 | 9/2008 |
| JP | 2009-164842 | 7/2009 |

(Continued)

OTHER PUBLICATIONS

3GPP TS 36.321 V10.1.0 (Mar. 2011), Technical Specification Group Radio Access Network.

*Primary Examiner* — Hicham Foud
(74) *Attorney, Agent, or Firm* — Fujitsu Patent Center

(57) ABSTRACT

A base station includes a transmission timing adjustment determination unit that determines whether to adjust a transmission timing of an uplink signal for each of user terminals; a radio resource allocation unit that allocates a radio resource for instruction information to be transmitted to first ones of the user terminals for which it has been determined that the transmission timing of the uplink signal is not to be adjusted; and an instruction information transmission unit that transmits the instruction information to the first ones of the user terminals. The instruction information indicates that the transmission timing is not to be adjusted, and the radio resource allocation unit allocates the instruction information to the radio resource to be shared and used by the first ones of the user terminals.

18 Claims, 21 Drawing Sheets

(56) References Cited

FOREIGN PATENT DOCUMENTS

| | | |
|---|---|---|
| WO | WO-2008-108223 | 9/2008 |
| WO | WO-2008-108224 | 9/2008 |
| WO | WO-2008-108225 | 9/2008 |
| WO | WO-2008-108226 | 9/2008 |
| WO | WO-2008-108227 | 9/2008 |
| WO | WO-2008-108228 | 9/2008 |

* cited by examiner

FIG.11

EXAMPLE ALLOCATION PARAMETERS

| | |
|---|---|
| NUMBER OF USER TERMINALS RECEIVING PDSCH OF SUBFRAME | 13 |
| NUMBER OF USER TERMINALS RECEIVING USER DATA | 3 (USER TERMINALS A,B,C) |
| NUMBER OF USER TERMINALS RECEIVING SHARED TA COMMAND | 10 (USER TERMINALS D-M) |
| $n_{CCE}$ REPORTED TO USER TERMINAL A | 0 |
| $n_{CCE}$ REPORTED TO USER TERMINAL B | 9 |
| $n_{CCE}$ REPORTED TO USER TERMINAL C | 15 |
| $n_{CCE}$ REPORTED TO USER TERMINALS D-M | 7 |
| $n^{(1)}_{PUCCH}$ REPORTED TO USER TERMINALS D-M | 0,1,2,3,4,5,6,7,8,9 |
| $N^{(2)}_{RB}$ | 2 |
| $N^{(1)}_{cs}$ | 0 |
| $\Delta^{PUCCH}_{shift}$ | 1 |
| $N^{(1)}_{PUCCH}$ | 30 |

FIG.12

PUCCH REGION TRANSMITTED BY USER TERMINAL

| USER TERMINAL | $n_{CCE}$ | $n^{(1)}_{PUCCH}$ | m |
|---|---|---|---|
| A (USER DATA RECEPTION) | 0 | 30 | 2 |
| B (USER DATA RECEPTION) | 9 | 39 | 3 |
| C (USER DATA RECEPTION) | 15 | 45 | 3 |
| D (SHARED TA COMMAND RECEPTION) | 7 | 0 | 2 |
| E (SHARED TA COMMAND RECEPTION) | 7 | 1 | 2 |
| F (SHARED TA COMMAND RECEPTION) | 7 | 2 | 2 |
| G (SHARED TA COMMAND RECEPTION) | 7 | 3 | 2 |
| H (SHARED TA COMMAND RECEPTION) | 7 | 4 | 2 |
| I (SHARED TA COMMAND RECEPTION) | 7 | 5 | 2 |
| J (SHARED TA COMMAND RECEPTION) | 7 | 6 | 2 |
| K (SHARED TA COMMAND RECEPTION) | 7 | 7 | 2 |
| L (SHARED TA COMMAND RECEPTION) | 7 | 8 | 2 |
| M (SHARED TA COMMAND RECEPTION) | 7 | 9 | 2 |

FIG.18

| CQI | MOVING SPEED | SHARED TA COMMAND GROUP |
|---|---|---|
| 12-15 | ~3km/h | 1 |
| | ~99km/h | 2 |
| | 100km/h~ | 3 |
| 8-11 | ~3km/h | 4 |
| | ~99km/h | 5 |
| | 100km/h~ | 6 |
| 4-7 | ~3km/h | 7 |
| | ~99km/h | 8 |
| | 100km/h~ | 9 |
| 0-3 | ~3km/h | 10 |
| | ~99km/h | 11 |
| | 100km/h~ | 12 |

BASE STATION, USER TERMINAL, AND COMMUNICATION METHOD

CROSS-REFERENCE TO RELATED APPLICATION

This application is based upon and claims the benefit of priority of Japanese Patent Application No. 2011-117288, filed May 25, 2011, the entire contents of which are incorporated herein by reference.

FIELD

The embodiment discussed herein is related to a radio communication system.

BACKGROUND

FIG. 1 illustrates radio resources of a downlink signal in a Long Term Evolution (LTE) system. In FIG. 1, the horizontal axis represents a time axis, and the vertical axis represents a frequency axis.

In the LTE system, Orthogonal Frequency Division Multiplexing (OFDM) is used in downlink communications. Specifically, one radio frame has ms, and data are communicated in one millisecond called a subframe. One subframe has two slots (first half and second half slots), and each slot has seven OFDM symbols.

The first three OFDM symbols in the first half slot are assigned (allocated) to a control channel called a Physical Downlink Control Channel (PDCCH). Further, Downlink Control Information (DCI) is assigned to the Physical Downlink Control Channel (PDCCH). The Downlink Control Information (DCI) reports assignment (allocation) information of resource blocks (RB) assigned to each user equipment (UE) and RB assignment information in uplink to each user equipment.

Herein, the "RB" refers to the minimum unit assigned to user data and having twelve subcarriers in each slot. A set of the OFDM symbols excluding the OFDM symbols for the Physical Downlink Control Channel (PDCCH) is called a Physical Downlink Shared Channel (PDSCH). The number of the symbols of the Physical Downlink Control Channel (PDCCH) is determined by the system.

FIG. 2 illustrates radio resources of an uplink signal in the LTE system. In FIG. 2, the horizontal axis represents a time axis, and the vertical axis represents a frequency axis.

The radio frame, the subframe, the slot and the RB in the uplink signal are the same as those in the downlink signal.

The radio resources in the uplink signal are assigned to a Physical Uplink Control Channel (PUCCH) and a Physical Uplink Shared Channel (PUSCH) The Physical Uplink Control Channel (PUCCH) is used to report Acknowledgement/Negative Acknowledgement (ACK/NACK) in response to user data in the downlink signal and channel quality indicator (CQI) at the user terminal (or User Equipment (UE)). Further, user data are assigned to the Physical Uplink Shared Channel (PUSCH).

The Physical Uplink Control Channel (PUCCH) is assigned at both ends of the system bandwidth by the RB. The area of the resource blocks of the Physical Uplink Control Channel (PUCCH) is determined by the system.

The transmission timing of the uplink signal is corrected (adjusted) by using a Timing Advance (TA) Command. Here, the correction (adjustment) of the transmission timing of the uplink signal refers to a process of correcting (adjusting) the transmission timing of the uplink signal performed by the user terminal based on instructions from the base station (eNB: eNodeB) so that the base station may receive the Physical Uplink Shared Channel (PUSCH) and the Physical Uplink Control Channel (PUCCH) and a Sounding Reference Signal (SRS) at appropriate timings at the receiving end of the base station.

The base station calculates an offset of the reception timing of the uplink radio frame from the user terminal by using the transmission timing of the downlink radio frame as a reference. When the offset occurs (is required), the base station issues the timing advance command to instruct the user terminal to correct the transmission timing of the uplink signal. The timing correction is performed by a 0.52 µs step. A value "0x1F" of the reference of the timing advance command is used as a reference. Namely, the value "0x1F" of the reference of the timing advance command indicates that no correction of the transmission timing is necessary.

There has been known a method of correcting the transmission timing of the uplink signal (see, for example, 3GPP TS36.321 V10.1.0, "5.2 Maintenance of Uplink Time Alignment" 2011-03).

FIG. 3 illustrates an example sequence diagram in data communication between the base station (eNB) and the user terminal (UE). More specifically, FIG. 3 illustrates a sequence where the base station stops the transmission of the Timing Advance Command.

Before starting the data communication, the base station and the user terminal execute a Random Access Procedure (Initial Access). In FIG. 3, a process in steps S31 through S35 is called the Random Access Procedure (Initial Access).

The user terminal transmits a Random Access Preamble to the base station (step S31).

Upon detecting (receiving) the Random Access Preamble, the base station transmits a Random Access Response to the user terminal (step S32). The Random Access Response includes uplink RB assignment information and Temporary C-RNTI. The RB assignment information is necessary for the transmission of an Uplink-Shared Channel (UL-SCH) by the user terminal (step S32).

Upon receiving the Random Access Response, the user terminal transmits an RRC connection Request (RRC message) to the base station (step S33).

After the reception of the RRC connection Request, the base station transmits an RRC Connection Setup (RRC message) to the user terminal (step S34).

After the reception of the RRC connection Setup, the user terminal transmits an RRC Connection Setup Complete (RRC message) to the base station (step S35).

After the completion of the Random Access Procedure (Initial Access), the base station uses an RRC Connection Reconfiguration (RRC message) to report the setting values of the Physical Uplink Control Channel (PUCCH) and the Sounding Reference Signal (SRS) to the user terminal (step S36).

The user terminal transmits an RRC Connection Reconfiguration Complete to the base station as the response to the setting values. After that, U-plane communications are performed.

Further, after the completion of the Random Access Procedure (Initial Access), the user terminal monitors the Timing Advance (TA) Command from the base station. Depending on whether the user terminal receives the Timing Advance (TA) Command, the user terminal transmits the ACK or the NACK (step S39). Upon the reception of the Timing Advance (TA) Command, the user terminal starts a Time Alignment Timer (again).

The base station stops the transmission of the Timing Advance (TA) Command (step S41). When the Time Alignment Timer is terminated, the user terminal releases the Physical Uplink Control Channel (PUCCH) and the Sounding Reference Signal (SRS) (step S42). To transmit the Physical Uplink Control Channel (PUCCH) and the Sounding Reference Signal (SRS) by the user terminal, it is necessary to execute the Random Access Procedure (Initial Access). The value of the Time Alignment Timer is determined by the system.

SUMMARY

According to an aspect of the present invention, a base station includes a transmission timing adjustment determination unit determining whether to adjust a transmission timing of an uplink signal for each of user terminals; a radio resource allocation unit allocating a radio resource for instruction information to be transmitted to first ones of the user terminals for which it has been determined, by the transmission timing adjustment determination unit, that the transmission timing of the uplink signal is not to be adjusted, the instruction information indicating that the transmission timing of the uplink signal is not to be adjusted; and an instruction information transmission unit transmitting the instruction information to the first ones of the user terminals using the radio resource allocated by the radio resource allocation unit. Further, the radio resource allocation unit allocates the instruction information to a radio resource to be shared and used by the first ones of the user terminals.

The objects and advantages of the embodiments disclosed herein will be realized and attained by means of the elements and combinations particularly pointed out in the claims.

It is to be understood that both the foregoing general description and the following detailed description are exemplary and explanatory and are not restrictive of the invention as claimed.

BRIEF DESCRIPTION OF DRAWINGS

FIG. 11 illustrates example parameters to be designated when the radio resource is assigned to the control channel according to an embodiment;

FIG. 12 illustrates an example radio resource to be assigned to the control channel according to an embodiment;

FIG. 18 is an example table used when a Shared Timing Advance (TA) Command Group is selected;

DESCRIPTION OF EMBODIMENTS

After the base station stops the transmission of the Timing Advance (TA) Command, when the Time Alignment Timer having started based on the finally received Timing Advance (TA) Command is terminated, the user terminal releases the Physical Uplink Control Channel (PUCCH) and the Sounding Reference Signal (SRS).

Therefore, if the user terminal does not desire to release the Physical Uplink Control Channel (PUCCH) and the Sounding Reference Signal (SRS), it may be necessary for the base station to cause the user terminal to receive the Timing Advance (TA) Command before the Time Alignment Timer is terminated.

To cause the user terminal to receive the Timing Advance (TA) Command, when there exists data to be transmitted downlink at the timing of the transmission of the Timing Advance (TA) Command, the data being other than the Timing Advance (TA) Command, the Timing Advance (TA) Command may be transmitted by including the Timing Advance (TA) Command into the data to be transmitted downlink. However, when there is no data to be transmitted downlink at the timing of the transmission of the Timing Advance (TA) Command, it may become necessary to transmit the Timing Advance (TA) Command alone.

Figure 1:
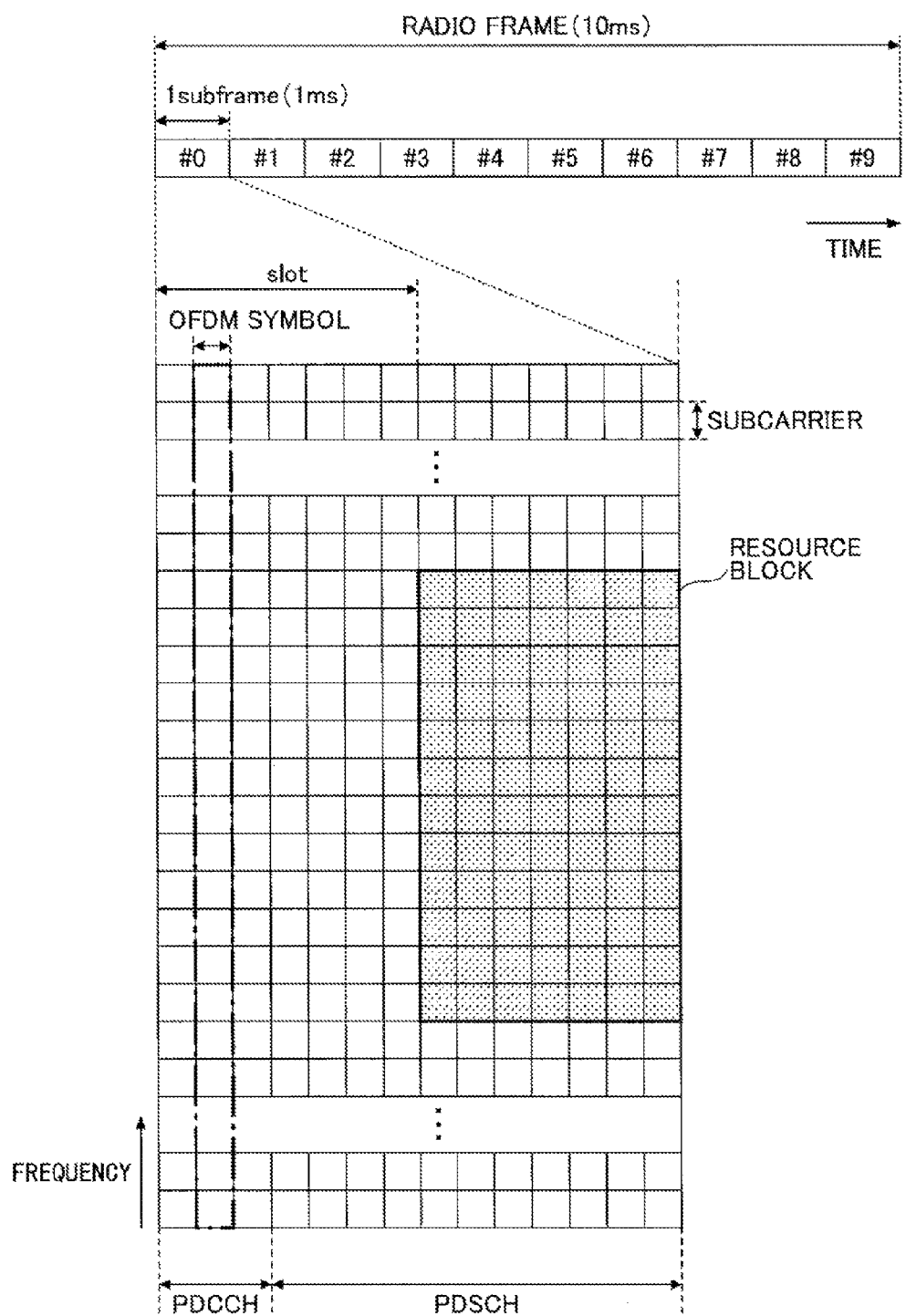
FIG. 1 illustrates an example radio resource in a downlink signal.
Figure 2:
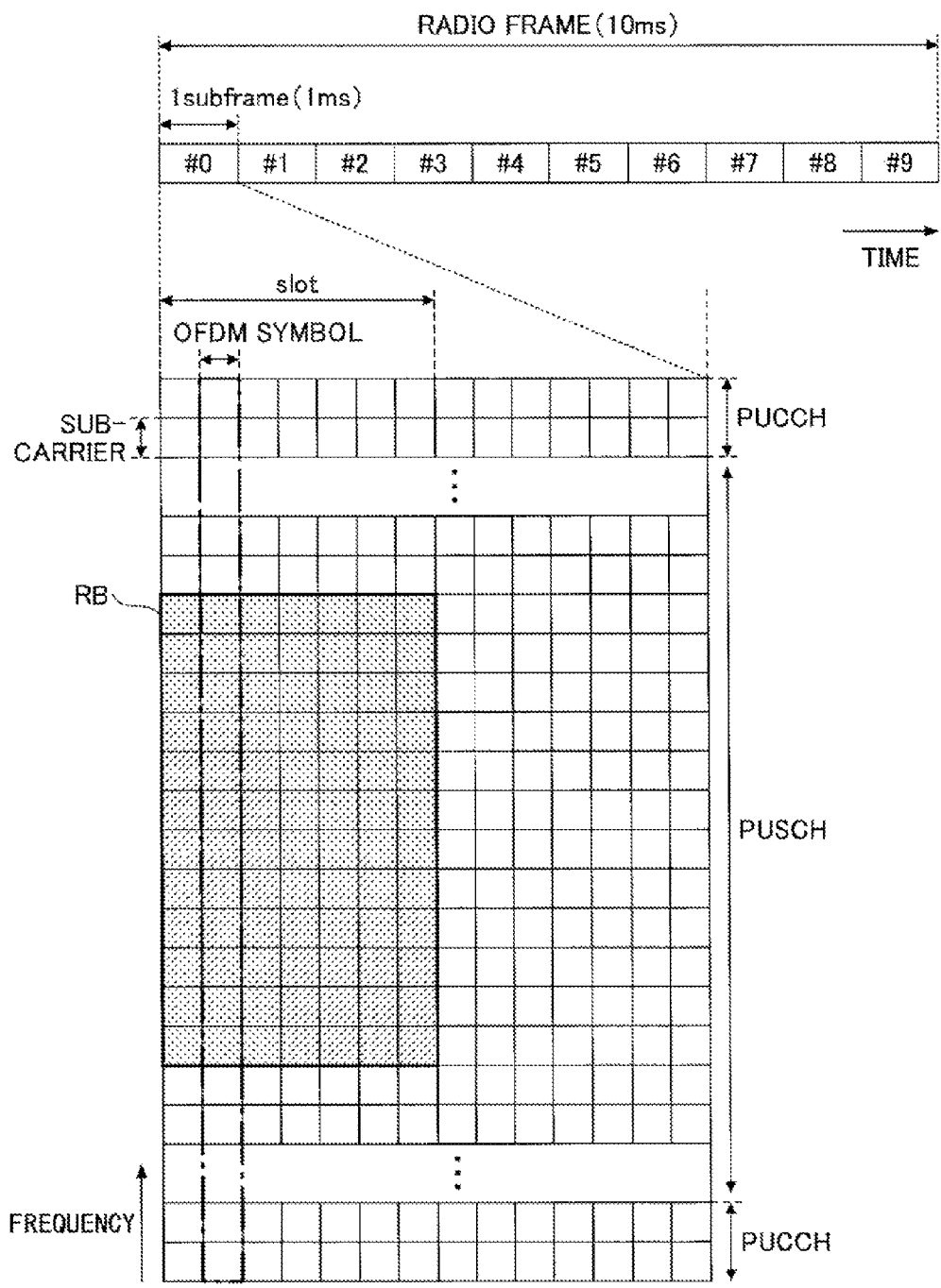
FIG. 2 illustrates an example radio resource in an uplink signal.
Figure 3:
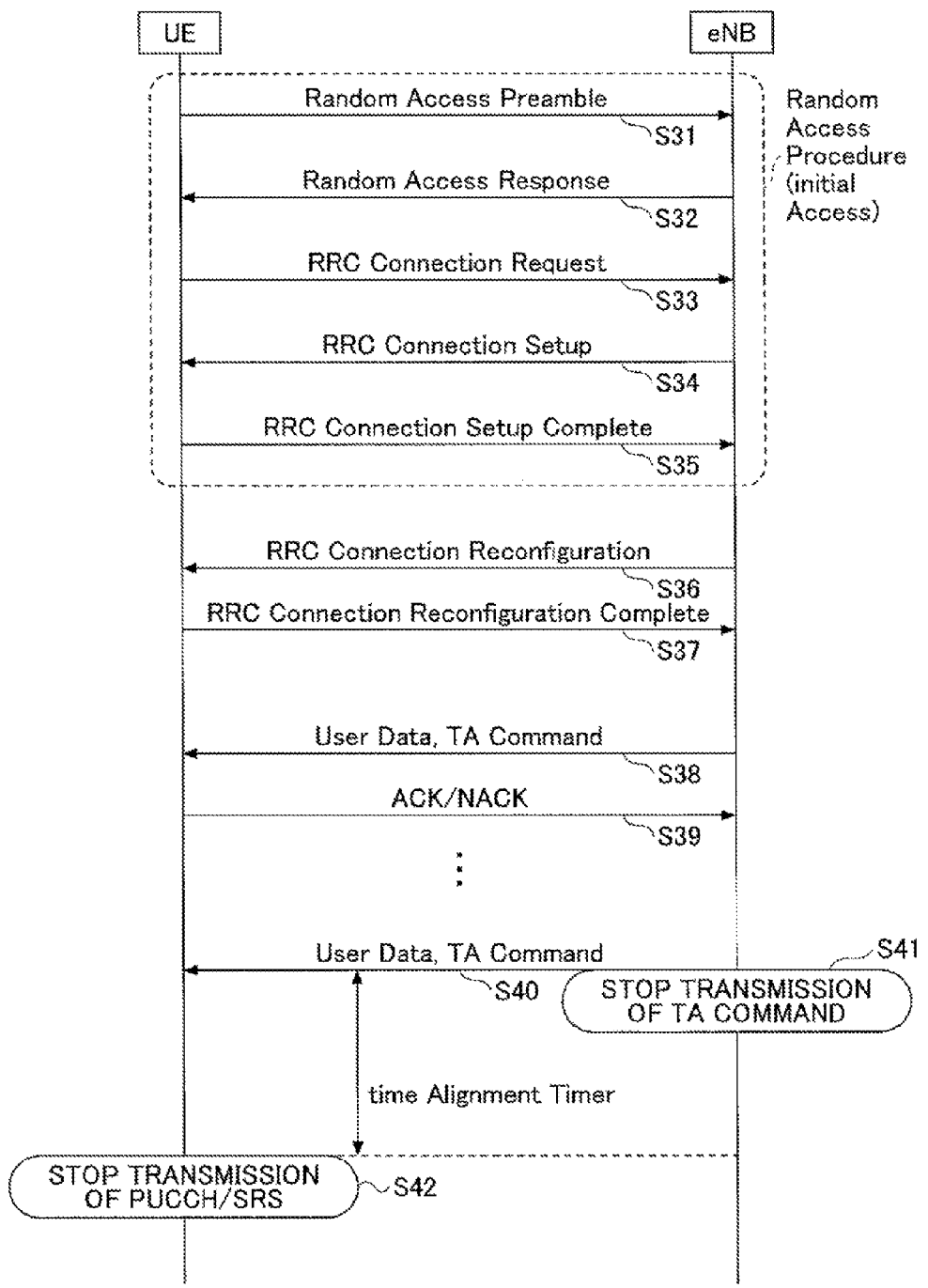
FIG. 3 is an example sequence diagram illustrating communications between a base station and a user terminal.
Figure 4:
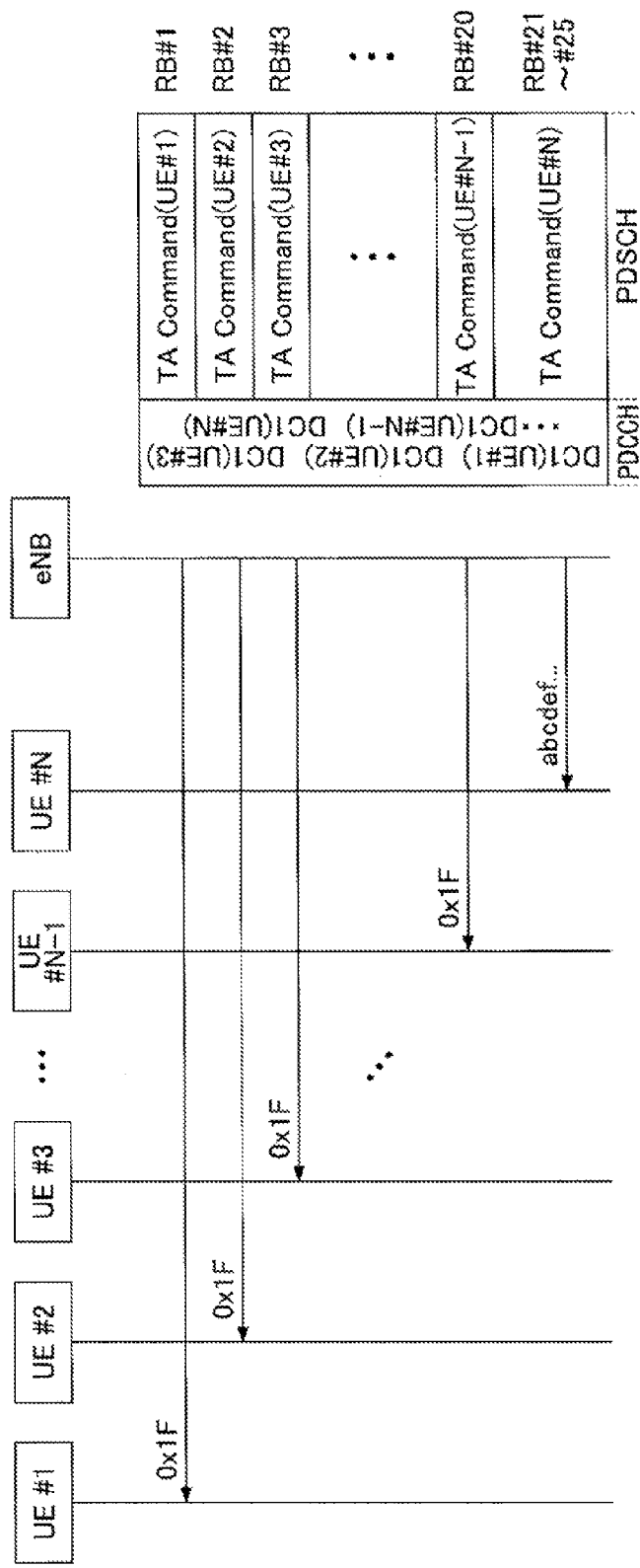
FIG. 4 illustrates an example of a transmission of a Timing Advance (TA) Command.

FIG. 4 illustrates an example of the transmission of the Timing Advance (TA) Command.

Here, a case is assumed where there are plural user terminals (UE#1, UE#2, UE#3, . . . , UE#(N−1)) that receive the Timing Advance (TA) Command and none of the user terminals are necessary to correct (adjust) the uplink transmission timing.

In this case, as illustrated in FIG. 4, with the increase of the number of the user terminals that receive the Timing Advance (TA) Command, the rate of the same data (i.e., TA Command=0x1F) in the Physical Downlink Shared Channel (PDSCH) may be increased. Therefore, the radio resources that may be used for the transmission of the user data may be reduced.

FIG. 4 illustrates an example of the transmission of plural Timing Advance (TA) Commands to be received by the plural user terminals (UE#1, UE#2, UE#3, . . . , UE#(N−1)).

However, even when the Timing Advance (TA) Command to be received by one user terminal is transmitted in one subframe, there may a case where the Physical Downlink Shared Channel (PDSCH) including the Timing Advance (TA) Command to be received by a different user terminal may be transmitted in the subframe to be transmitted at a different timing.

When the Physical Downlink Shared Channel (PDSCH) including the Timing Advance (TA) Command to be received by a different user terminal is transmitted in the subframe transmitted at a different timing, the radio resources that may be used to transmit the user data in the subframe transmitted at the different timing may be reduced.

As a result of the decrease of the radio resources that may be used for the transmission of the user data, an effective throughput in downlink may be reduced. Further, the base station transmits the same number of the Downlink Control Information (DCI) as that of the user terminals. Therefore, the radio resources of the Physical Downlink Control Channel (PDCCH) may be depleted.

In the following, an embodiment is described with reference to the accompanying drawings.

In the drawings and description, the same reference numerals are used to describe the elements having the same functions, and repeated descriptions thereof may be omitted.

Radio Communication System

A radio communication system includes a base station 200 and a user terminal 100.

The user terminal 100 may be included in a mobile device (mobile terminal). The mobile device may include, but is not limited to, any appropriate terminal allowing a user to communicate such as a cellular phone, an information terminal, a personal digital assistant, a portable personal computer and the like.

In this embodiment, a case is described where in a radio communication, a Single-Carrier Frequency-Division Multiple Access (SC-FDMA) scheme is used uplink and the OFDM scheme is used downlink. However, the present invention is not limited to this example. Namely, the present invention may be applied to a radio communication system where information to correct the transmission timing of an uplink signal is transmitted.

Base Station

Figure 5:
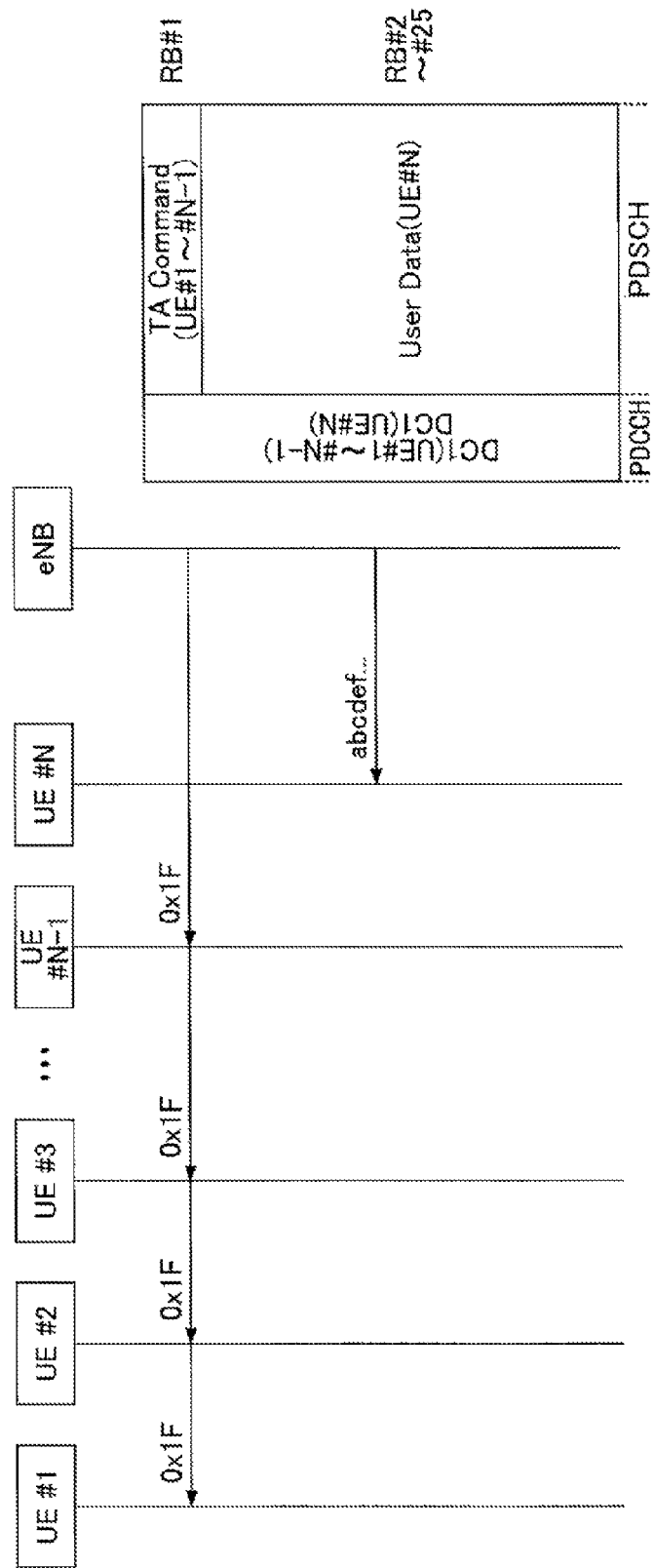
FIG. 5 illustrates an example of a transmission of a Shared Timing Advance (TA) Command according to an embodiment.

FIG. 5 illustrates an example assignment (allocation) of a Resource Block (RB) to transmit the Physical Downlink Shared Channel (PDSCH).

In a case where there exist plural user terminals that receive the Timing Advance (TA) Command, when the Timing Advance (TA) Command transmitted to the plural user terminals has the value "0x1F" indicating that it is not necessary to adjust (correct) the transmission timing of the uplink signal, the number of the Timing Advance (TA) Command to be transmitted in one subframe is set to one.

Namely, the base station 200 does not separately designate the Timing Advance (TA) Command with respect to the user terminals. The user terminals receiving the Timing Advance (TA) Command share the Timing Advance (TA) Command in the one subframe. In the following, the Timing Advance (TA) Command indicating that it is not necessary to adjust the transmission timing of an uplink signal to be shared among plural user terminals may be referred to as a "Shared Timing Advance (TA) Command". Further, the plural user terminals (UEs) sharing the Shared Timing Advance (TA) Command refers to a "Shared Timing Advance (TA) Command Group".

The Physical Downlink Shared Channel (PDSCH) is scrambled with a Connection-Radio Network Temporary Identifier (C-RNTI). Therefore, in a case where the Timing Advance (TA) Command is shared among the plural user terminals, if the C-RNTI for all the user terminals used to scramble the Timing Advance (TA) Command is used, the Timing Advance (TA) Command may not be decoded by the user terminals.

Therefore, the Radio Network Temporary Identifier (RNTI) to be shared for the Shared Timing Advance (TA) Command is separately set. Hereinafter, the Radio Network Temporary Identifier (RNTI) to be shared for the Shared Timing Advance (TA) Command is called a "Shared Radio Network Temporary Identifier (Shared RNTI)".

The Shared Timing Advance (TA) Command is scrambled with the Shared Radio Network Temporary Identifier (Shared RNTI). The user terminal receiving the Shared Timing Advance (TA) Command may receive the Shared Timing Advance (TA) Command by releasing the scramble of (descrambling) the Shared Timing Advance (TA) Command) using the Shared RNTI.

Further, the Downlink Control Information (DCI) is reported using the Shared RNTI. Namely, the Downlink Control Information (DCI) is scrambled with (using) the Shared RNTI. By scrambling the Downlink Control Information (DCI) using the Shared RNTI, it may become possible to prevent the depletion of the radio resources of the Physical Downlink Control Channel (PDCCH).

This is because, it may not be necessary to separately designate the Downlink Control Information (DCI) for each of the user terminals and the user terminals receiving the Shared Timing Advance (TA) Command may share the Downlink Control Information (DCI).

The radio resource number of the Physical Uplink Control Channel (PUCCH) used to report ACK or NACK by the user terminals in response to the Shared Timing Advance (TA) Command may be determined and fixed for each of the user terminals.

The base station 200 transmits (reports) the Shared RNTI and the radio resource numbers of the Physical Uplink Control Channel (PUCCH) to transmit the ACK or the NACK to the user terminals included in the Shared Timing Advance (TA) Command Group using an RRC message.

The user terminal having received the RRC message further receives the Downlink Control Information (DCI) using the reported Shared RNTI. In response to the RRC message, the user terminal having received the RRC message reports a response to the base station 200. The base station 200 manages the user terminals reporting the response as the Shared Timing Advance (TA) Command Group.

In this case, when the Downlink Control Information (DCI) reported with the C-RNTI of the user terminal is included in the subframe, the user terminal included in the Shared Timing Advance (TA) Command Group may preferentially receive the Downlink Control Information (DCI) reported with the C-RNTI of the user terminal (i.e., with a higher priority).

Further, when the number of the user terminals sharing the Shared Timing Advance (TA) Command in one subframe is increased, the radio resources of the Physical Uplink Control Channel (PUCCH) to transmit the ACK or the NACK may become insufficient.

Namely, when the number of the user terminals included in the Shared Timing Advance (TA) Command Group is increased, the radio resources of the Physical Uplink Control Channel (PUCCH) to transmit the ACK or the NACK are assigned (allocated) to the user terminals, the radio resources of the Physical Uplink Control Channel (PUCCH) to transmit the ACK or the NACK may become insufficient.

Therefore, an upper limit value may be set to the number of the user terminals sharing the Shared Timing Advance (TA) Command. By setting the upper limit value to the number of the user terminals sharing the Shared Timing Advance (TA) Command, it may become possible to prevent the shortage of the radio resource to transmit the Physical Uplink Control Channel (PUCCH).

In this case, if the number of the user terminals exceeds the upper limit of the number of the user terminals sharing the Shared Timing Advance (TA) Command, a new Shared RNTI corresponding to the Shared Timing Advance (TA) Command that is shared by the extra user terminals exceeding the upper limit of the number of the user terminals may be set (generated).

Figure 6:
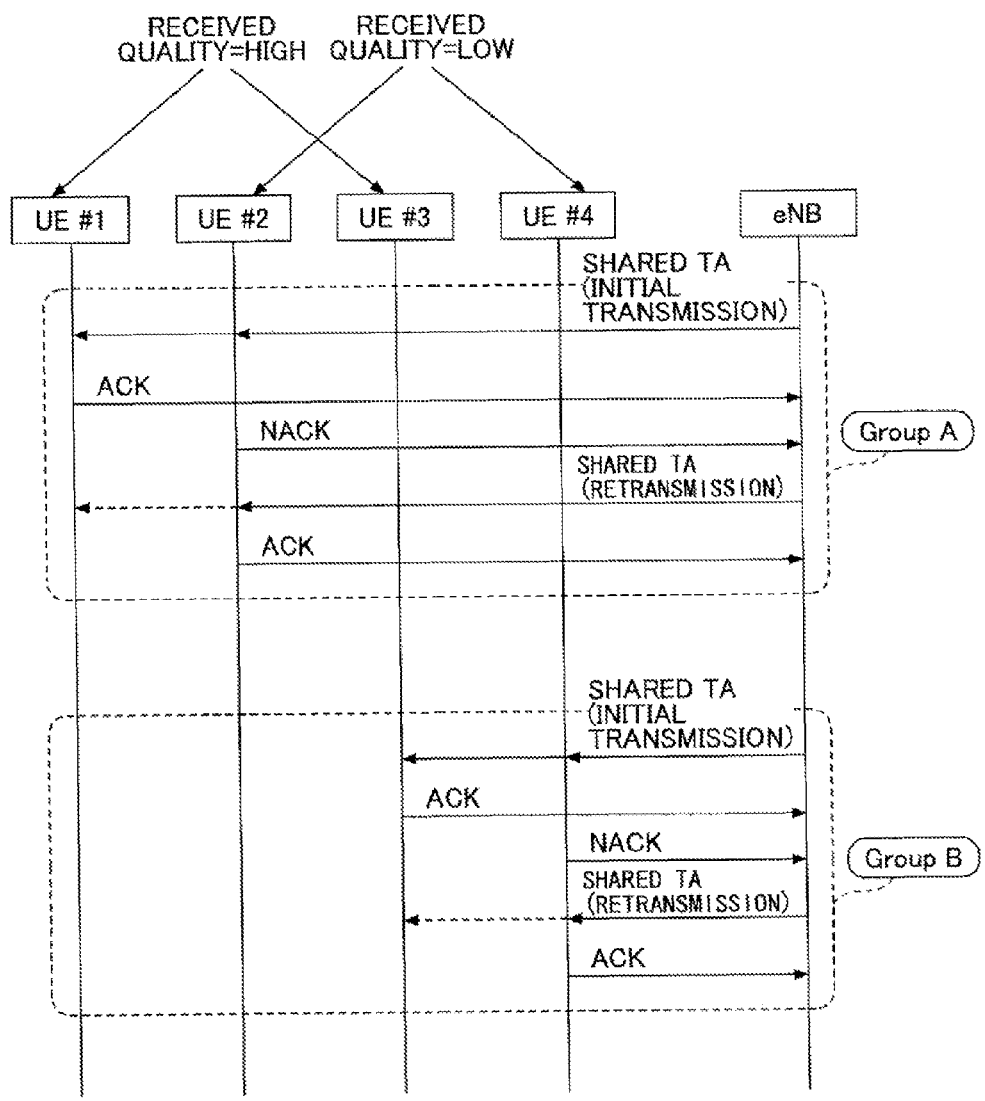
FIG. 6 illustrates an example of a transmission of the Shared Timing Advance (TA) Command according to an embodiment.

FIG. 6 illustrates a first example of the transmission of the Shared Timing Advance (TA) Command.

In the example of FIG. 6, there are plural groups, each of which corresponds to a group including plural user terminals receiving the Shared Timing Advance (TA) Command (i.e., the Shared Timing Advance (TA) Command Group). The user terminals included in each of the plural groups may have remarkably different received qualities.

More specifically, FIG. 6 illustrates a case where the number of the groups is two. However, when the number of the groups is three or more, the transmission method as illustrated in FIG. 6 may also be applied. In FIG. 6, the user terminal UE#1 and the user terminal UE#2 are included in group A, and the user terminal UE#3 and the user terminal UE#4 are included in group B.

In group A, the Shared Timing Advance (TA) Command is shared between the user terminal UE#1 and the user terminal UE#2. In group B, the Shared Timing Advance (TA) Command is shared between the user terminal UE#3 and the user terminal UE#4.

Here, it is assumed that the received quality of the user terminal UE#1 and the user terminal UE#3 is good and the received quality of the user terminal UE#2 and the user terminal UE#4 is poor.

In this case, in each of the user terminals, there is a possibility of occurrence of retransmission of the Shared Timing Advance (TA) Command. This is because there is a high possibility that the user terminal UE#2 and the user terminal UE#4 do not receive the Shared Timing Advance (TA) Command due to poor received quality.

To reduce the number of the retransmissions of the Shared Timing Advance (TA) Command by the base station 200, the user terminals are grouped (classified) in a manner such that the user terminals having the same degree of the received quality are grouped into the same group. Specifically, for example, based on the CQI or moving speed, the user terminals may be grouped.

By grouping the user terminals having the same degree of the received quality into the same group, it may become possible to reduce the frequency of occurrence of the retransmission of the Shared Timing Advance (TA) Command.

Figure 7:
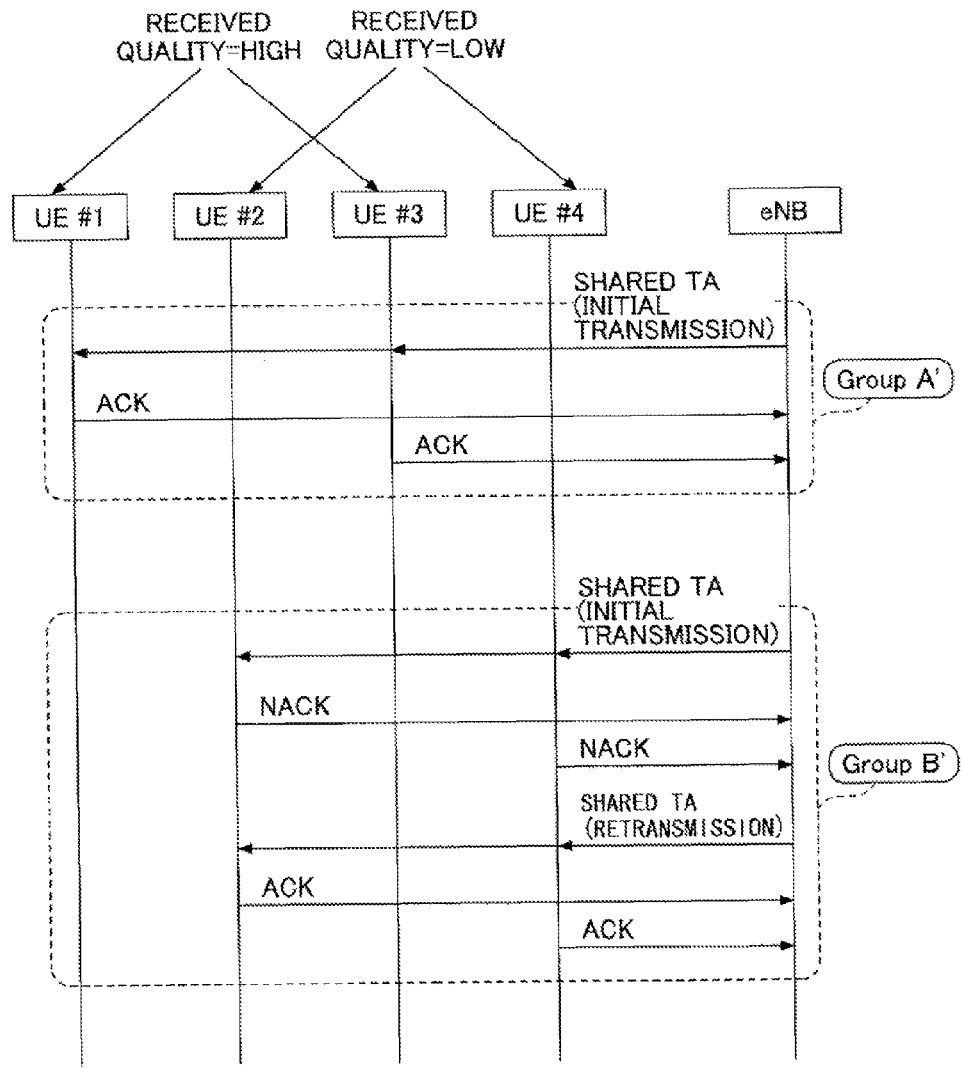
FIG. 7 illustrates an example of a transmission of the Shared Timing Advance (TA) Command according to an embodiment.

FIG. 7 illustrates a second example of the transmission of the Shared Timing Advance (TA) Command.

In the example of FIG. 7, the user terminals including in each of the groups have the same degree of the received quality. FIG. 7 illustrates a case where the number of the groups is two. However, when the number of the groups is three or more, the transmission method as illustrated in FIG. 7 may also be applied.

In FIG. 7, the user terminal UE#1 and the user terminal UE#3 are included in group A', and the user terminal UE#2 and the user terminal UE#4 are included in group B'. In group A', the Shared Timing Advance (TA) Command is used (shared) between the user terminal UE#1 and the user terminal UE#3. In group B', the Shared Timing Advance (TA) Command is used (shared) between the user terminal UE#2 and the user terminal UE#4.

In the case of FIG. 7, it is assumed that the received quality of the user terminal UE#1 and the user terminal UE#3 is good. Therefore, it is estimated that the frequency of occurrence of the retransmission of the Shared Timing Advance (TA) Command in group A' is low.

On the other hand, it is assumed that the received quality of the user terminal UE#2 and the user terminal UE#4 is poor. Therefore, it is estimated that the frequency of occurrence of the retransmission of the Shared Timing Advance (TA) Command in group B' is high.

In the example of FIG. 6, retransmission occurs in each of the groups. On the other hand, in the example of FIG. 7, in only one of the groups, retransmission occurs.

Therefore, by grouping the user terminals having the same degree of the received quality into the same group, it may become possible to reduce the frequency of occurrence of the retransmission of the Shared Timing Advance (TA) Command.

Further, when determining that the user terminal 100 has not (correctly) received the Shared Timing Advance (TA) Command, the base station 200 retransmits the Shared Timing Advance (TA) Command. Specifically, upon receiving the NACK from the user terminal 100 as the response to the Shared Timing Advance (TA) Command, when determining that the user terminal 100 has not (correctly) received the Downlink Control Information (DCI), the base station 200 determines that the user terminal 100 has not (correctly) received the Shared Timing Advance (TA) Command.

In this regard, for example, it may be determined that the user terminal 100 has not (correctly) received the Shared Timing Advance (TA) Command if none of the ACK and the NACK has been received from the user terminal 100.

When the base station 200 retransmits the Shared Timing Advance (TA) Command, the user terminal included in the group and having (already) received the Shared Timing Advance (TA) Command receives the Shared Timing Advance (TA) Command again. It is not a problem when the user terminal having (already) received the Shared Timing Advance (TA) Command receives the Shared Timing Advance (TA) Command again.

However, a receiving process of the Physical Downlink Shared Channel (PDSCH), a transmission process of the ACK or the NACK by the user terminal 100 having received Shared Timing Advance (TA) Command and a receiving process of the ACK or the NACK become fruitless (meaningless).

Therefore, to reduce the process of receiving the Physical Downlink Shared Channel (PDSCH) and the process of transmitting the ACK or the NACK by the user terminal having received the Shared Timing Advance (TA) Command and the process of receiving the ACK or the NACK by the base station 200, the user terminal having received the Shared Timing Advance (TA) Command may not perform any process on retransmitted Shared Timing Advance (TA) Command.

Specifically, the user terminal 100 may use a process number so as to determine whether the Shared Timing Advance (TA) Command is newly (initially) transmitted or retransmitted. For example, two process numbers to be used for the transmission of the Shared Timing Advance (TA) Command are determined, so that the two process numbers are alternately switched whenever the Shared Timing Advance (TA) Command is newly (initially) transmitted. Alternatively, three or more process numbers to be used for the transmission of the Shared Timing Advance (TA) Command may be used.

By using the process numbers, it may become possible for the user terminal 100 to determine the retransmission of the Shared Timing Advance (TA) Command when the process number of the Downlink Control Information (DCI) received (this time) is the same as that of the Downlink Control Information (DCI) received upon the previous reception of the Shared Timing Advance (TA) Command. When determining that the received Shared Timing Advance (TA) Command is retransmitted, the user terminal 100 may complete (skip) the process of the subframe.

On the other hand, when determining that the process number of the Downlink Control Information (DCI) received (this time) is different from that of the Downlink Control Information (DCI) received upon the previous reception of the Shared Timing Advance (TA) Command, the user terminal 100 determines that the received Shared Timing Advance (TA) Command is newly (initially) transmitted. Then, the user terminal 100 performs the process of receiving the Physical Downlink Shared Channel (PDSCH) based on the received Downlink Control Information (DCI) (e.g., Shared Timing Advance (TA) Command).

When receiving the Downlink Control Information (DCI) having the process number that is different from the process number of the Downlink Control Information (DCI) received when the previously received Shared Timing Advance (TA) Command was previously received, by performing the process on the Physical Downlink Shared Channel (PDSCH) based on the received Downlink Control Information (DCI), it may become possible for the user terminal having received the Shared Timing Advance (TA) Command to avoid the execution of the process of receiving the retransmitted Shared Timing Advance (TA) Command.

In this case, the process number to be used for the Shared Timing Advance (TA) Command may be reported along with the report of the resource numbers of the Physical Uplink Control Channel (PUCCH) transmitting the Shared RNTI and the ACK or the NACK.

In the user terminal included in the Shared Timing Advance (TA) Command Group, 1) when user data are generated; 2) when it becomes necessary to transmit the Timing Advance (TA) Command indicating a value other than "0x1F" due to a shift of the transmission timing of the uplink signal; and 3) when the Time Alignment Timer is terminated, and at least one of the Physical Uplink Control Channel (PUCCH) and the Sounding Reference Signal (SRS) is released, the user terminal is excluded from the Shared Timing Advance (TA) Command Group.

To exclude the user terminal from the Shared Timing Advance (TA) Command Group, the base station 200 instructs the user terminal using the RRC message to stop the reception of the Shared Timing Advance (TA) Command. The user terminal having received the instructions to stop the reception of the Shared Timing Advance (TA) Command responds to the base station by using the RRC message.

Upon receipt of the RRC message, the base station 200 excludes the base station from the Shared Timing Advance (TA) Command Group. Further, the base station 200 may transmit the Timing Advance (TA) Command to adjust the uplink transmission timing without waiting for receiving the response of the RRC message.

Base Station

Figure 8:
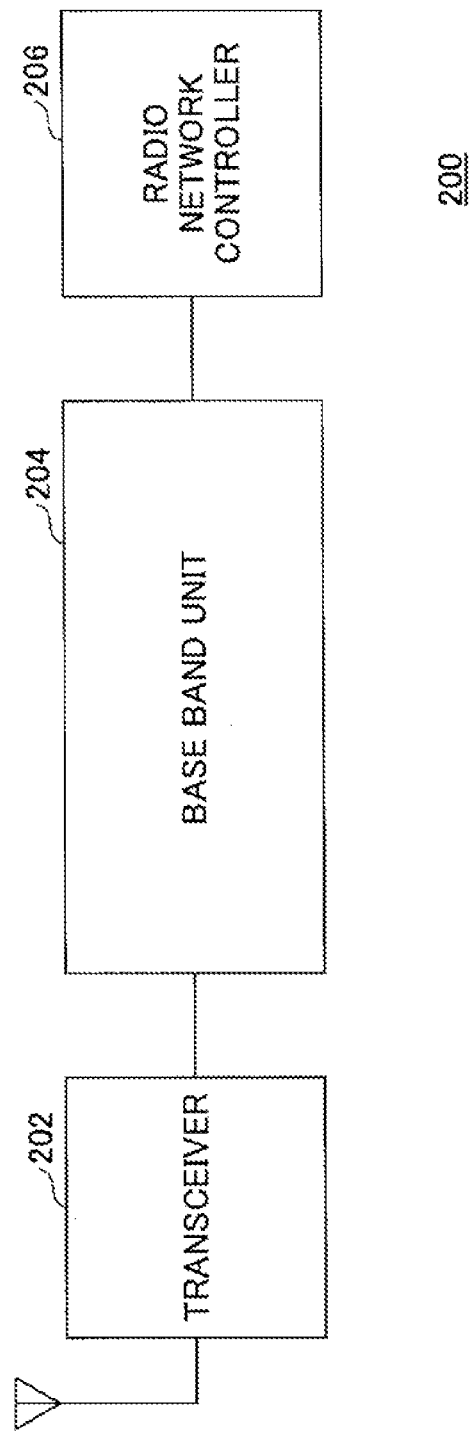
FIG. 8 illustrates an example configuration of the base station according to an embodiment.

FIG. 8 schematically illustrates an example base station 200 according to an embodiment. Specifically, FIG. 8 illustrates an example hardware configuration of the base station 200.

As illustrated in FIG. 8, the base station 200 includes a transceiver 202, a base band unit 204, and a radio network controller 206. The base band unit 204 is connected to the transceiver 202, and the radio network controller 206 is connected to the base band unit 204.

The transceiver 202 transmits and receives a radio signal to and from the user terminal 100. The radio signal received by an antenna is amplified and input to the transceiver 202. The transceiver 202 performs frequency conversion on the radio signal and inputs the signal to the base band unit 204. Further, the transceiver 202 converts a signal from the base band unit 204 into a radio signal and externally transmits via the antenna.

The base band unit 204 includes one or more Central Processing Units (CPUs). Further, the base band unit 204 may include one or more Digital Signal Processors (DSPs). The base band unit 204 performs call control. The base band unit 204 further performs protocol control. The base band unit 204 further performs a baseband process.

The baseband signal on which the baseband process is performed by the base band unit 204 is converted into a radio signal by a Radio-Frequency (RF) section (not shown) to be wirelessly transmitted to the user terminal 100. Further, the base band unit 204 inputs a signal on which the baseband process is performed to the radio network controller 206.

Figure 9:
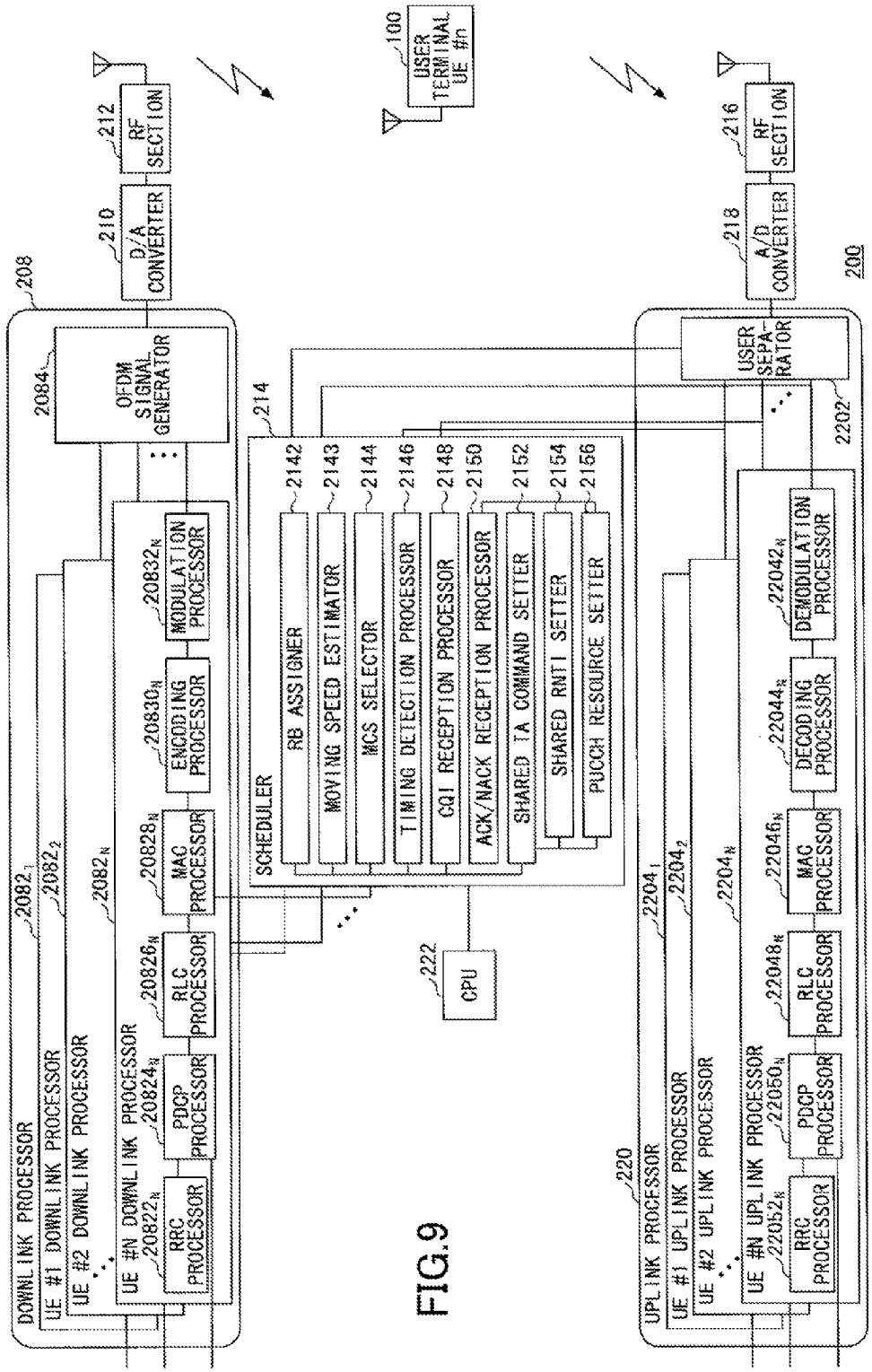
FIG. 9 illustrates an example configuration of the base station according to an embodiment.

The radio network controller 206 performs a predetermined process based on the signal from the base band unit 204. For example, the radio network controller 206 may transfer the signal to the address of the signal from the base band unit 204. Functions of base station FIG. 9 is an example functional block diagram of the base station 200 according to an embodiment. More specifically, FIG. 9 illustrates example functions of the transceiver 202 and the base band unit 204.

As illustrated in FIG. 9, the base station 200 includes a downlink processor 208, a D/A converter 210, an RF section 212, a scheduler 214, an RF section 216, an A/D converter 218, an uplink processor 220, and a CPU 222.

The downlink processor 208 includes a UE#1 downlink processor $2082_1$ through a UE#N downlink processor $2082_N$, (N: an integer greater than zero) and an OFDM signal generator 2084. The UE#N downlink processor $2082_N$ includes an RRC processor $20822_N$, a PDCP processor $20824_N$, an RLC processor $20826_N$, an MAC processor $20828_N$, an encoding processor $20830_N$, and a modulation processor $20832_N$.

The uplink processor 220 includes a user separator 2202, and a UE#1 uplink processor $2204_1$ through a UE#N uplink processor $2204_N$ (N: an integer greater than zero). The UE#N uplink processor $2204_N$ includes a demodulation processor $22042_N$, a decoding processor $22044_N$, an MAC processor $22046_N$, an RLC processor $22048_N$, a PDCP processor $22050_N$, and an RRC processor $22052_N$.

The scheduler 214 includes an RB assigner 2142, a moving speed estimator 2143, an MCS selector 2144, a timing detection processor 2146, a CQI reception processor 2148, an ACK/NACK reception processor 2150, a Shared TA Command setter 2152, a Shared RNTI setter 2154, and a PUCCH resource setter 2156.

By functioning the CPU 222 of the base band unit 204 as the RB assigner 2142, the moving speed estimator 2143, the MCS selector 2144, the timing detection processor 2146, the CQI reception processor 2148, the ACK/NACK reception processor 2150, the Shared TA Command setter 2152, the Shared RNTI setter 2154, and the PUCCH resource setter 2156, the functions of the scheduler 214 are realized. However, for example, the DSP (not shown) may alternatively be used.

In communications of the LTE system, two types of data, which are data (called C-plane) to control the UE and user data (called U-plane), are used.

A process of a downlink signal is described.

In a case of the C-plane, the RRC processor $20822_N$ determines parameters to control the user terminal, and the parameters are transformed into data. The parameters include the Shared RNTI to be set by the Shared RNTI setter 2154 and radio resource numbers of the Physical Uplink Control Channel (PUCCH) for the ACK and the NACK (ACK/NACK) to be set by the PUCCH resource setter 2156. The RRC processor $20822_N$ transfers the parameterized data to the PDCP (Packet Data Convergence Protocol) processor $20824_N$.

The PDCP processor $20824_N$ is connected to the RRC processor $20822_N$. The PDCP processor $20824_N$ performs a process on the transferred data as a Packet Data Convergence Protocol Service Data Unit (PDCP SDU), and converts the transferred data into a Packet Data Convergence Protocol Protocol Data Unit (PDCP PDU). PDCP processor $20824_N$ transfers the data converted into the PDCP PUD to the RLC processor $20826_N$.

The RLC processor $20826_N$ is connected to the PDCP processor $20824_N$. The RLC processor $20826_N$ performs a process on the transferred data as a Radio Link Control Service Data Unit (RLC SDU), and converts the transferred data into a Radio Link Control Protocol Data Unit (RLC PDU). The RLC processor $20826_N$ transfers the data converted into the RLC SDU to the MAC (Media Access Control) processor $20828_N$.

The MAC processor $20828_N$ is connected to the RLC processor $20826_N$. The MAC processor $20828_N$ performs a process on the transferred data as a MAC SDU, and converts the transferred data into a MAC PDU.

Further, the MAC processor $20828_N$ reports an information item to be reported from the scheduler 214 to the user terminal as a timing correction value using the Timing Advance (TA) Command, the information item indicating a difference between the transmission timing of the uplink signal at the user terminal and the transmission timing of the downlink signal from the base station 200.

Further, the MAC processor $20828_N$ reports the Shared Timing Advance (TA) Command to the terminal to which an information item is to be transmitted indicating that the transmission timing adjustment of the uplink signal is not necessary. The MAC processor $20828_N$ transfers the data converted into the MAC PDU to the encoding processor $20830_N$.

The encoding processor $20830_N$ is connected to the MAC processor $20828_N$. The encoding processor $20830_N$ performs error correction encoding on the data transferred from the MAC processor $20828_N$, and performs scrambling using the C-RNTI to be appended for each of the user terminals.

The encoding processor $20830_N$ performs error correction encoding on the data transferred from the MAC processor $20828_N$, and when the data are Shared Timing Advance (TA) Command, performs scrambling using the Shared RNTI to be commonly appended to user terminals in the Shared Timing Advance (TA) Command Group. The encoding processor $20830_N$ transfers the data scrambled using at least one of the C-RNTI and the Shared RNTI to the modulation processor $20832_N$.

The modulation processor $20832_N$ is connected to the encoding processor $20830_N$. The modulation processor $20832_N$ converts the signal from the encoding processor $20830_N$ into a modulation signal based on, for example, Quadrature Phase Shift Keying (QPSK), and transfers the modulation signal to the OFDM signal generator 2084.

In the UE#1 downlink processor $2082_1$ through the UE#N−1 downlink processor $2082_{N-1}$, the same processes as those of the UE#N downlink processor $2082_N$ are performed with respect to other user terminals.

The OFDM signal generator 2084 is connected to the modulation processor $20832_1$ through modulation processor $20832_N$. The OFDM signal generator 2084 generates an OFDM signal based on the signals modulated by the modulation processor $20832_1$ through the modulation processor $20832_N$. The OFDM signal generator 2084 inputs the generated OFDM signal to the D/A converter 210.

The scheduler 214 is connected to the UE#1 downlink processor $2082_1$ through the UE#N downlink processor $2082_N$. The scheduler 214 determines an RB assignment (allocation) indicating the RBs to be assigned (allocated) to the output signal from the UE#1 downlink processor $2082_1$ through the UE#N downlink processor $2082_N$.

In a case of the U-plane, the processes performed in the UE#1 downlink processor $2082_1$ through the UE#N downlink processor $2082_N$ except for the processes of the RRC processor $20822_1$ through the RRC processor $20822_N$ are performed. Namely, the data to be transmitted as the downlink signal are input to the PDCP processor $20824_1$ through the PDCP processor $20824_N$.

The D/A converter 210 is connected to the OFDM signal generator 2084. The D/A converter 210 performs D/A conversion on the baseband signal from the OFDM signal generator 2084. The D/A converter 210 inputs the D/A-converted baseband signal to the RF section 212.

The RF section 212 is connected to the D/A converter 210. The RF section 212 converts the baseband signal from the D/A converter 210 into a radio-frequency signal, and transmits the radio-frequency signal to the user terminals via a transmission antenna.

Next, A process of an uplink signal is described.

As the radio access method of the uplink signal in the LTE system, the SC-FDMA scheme is used.

The radio-frequency signals received from the user terminals are down-converted by the RF section 216. The down-converted signals are input to the A/D converter 218.

The A/D converter 218 is connected to the RF section 216. The A/D converter 218 converts the down-converted signals from the RF section 216 into baseband signals. The A/D converter 218 inputs the baseband signals to the user separator 2202.

The user separator 2202 is connected to the A/D converter 218 and the scheduler 214. The user separator 2202 separates the baseband signals for each of the user terminals based on the RB assignment (allocation) determined by the RB assigner 2142 of the scheduler 214.

The user separator 2202 inputs the baseband signals separated for each of the user terminals to the corresponding UE#1 uplink processor $2204_1$ through the UE#N uplink processor $2204_N$.

The same processes are commonly performed in the UE#1 uplink processor $2204_1$ through the UE#N uplink processor $2204_N$. Therefore, the processes in the UE#N uplink processor $2204_N$ are exemplarily described.

The demodulation processor $22042_N$ is connected to the user separator 2202. The demodulation processor $22042_N$ demodulates the signal from the user separator 2202. The demodulation processor $22042_N$ inputs the demodulated signal to the decoding processor $22044_N$.

The decoding processor $22044_N$ is connected to the demodulation processor $22042_N$. The decoding processor $22044_N$ performs an error correction decoding process on the demodulated signal from the demodulation processor $22042_N$ including descrambling the demodulated signal. The output signal from decoding processor $22044_N$ is input to the MAC processor $22046_N$.

The MAC processor $22046_N$ is connected to the decoding processor $22044_N$. The MAC processor $22046_N$ performs a process on the signal from the decoding processor $22044_N$ as the MAC PDU, and converts the signal into the MAC SDU. The MAC processor $22046_N$ transfers the MAC SDU to the RLC processor $22048_N$.

The RLC processor $22048_N$ is connected to the MAC processor $22046_N$. The RLC processor $22048_N$ performs a process on the data transferred from the MAC processor $22046_N$ as the RLC SDU, and converts the data into the RLC PDU. The RLC processor $22048_N$ transfers the RLC PDU to the PDCP processor $22050_N$.

The PDCP processor $22050_N$ is connected to the RLC processor $22048_N$. The PDCP processor $22050_N$ performs a process on the data transferred from the RLC processor $22048_N$ as the PDCP SDU. When the received data are U-plane, the PDCP processor $22050_N$ converts the data into the PDCP PDU, and transfers the data to the upper network as the PDCP PDU. When the received data are C-plane, the PDCP processor $22050_N$ transfers the data (PDCP PDU) to the RRC processor $22052_N$.

The RRC processor $22052_N$ is connected to the PDCP processor $22050_N$. The RRC processor $22052_N$ performs a process on the PDCP PDU from the PDCP processor $22050_N$.

The timing detection processor 2146 calculates the transmission timings of the uplink signals separated by the user separator 2202 for each of the user terminals.

The timing detection processor 2146 reports the information indicating the difference between the transmission timing from the existing user terminal 100 and the transmission timing of the downlink signal from the base station 200 to the Shared TA Command setter 2152.

The CQI reception processor 2148 decodes the CQI reported from the user terminal 100. The CQI reception processor 2148 inputs (reports) the CQI to the Shared TA Command setter 2152, the RB assigner 2142, and the MCS selector 2144.

The moving speed estimator 2143 estimates the moving speed of the user terminal 100. In this case, for example, the moving speed may be estimated based on the Doppler frequency. The moving speed estimator 2143 inputs the information indicating the estimation result of the moving speed of the user terminal 100 to the RB assigner 2142.

The MCS selector 2144 selects an (appropriate) MCS (Modulation and Coding Scheme) based on the CQI reported from the CQI reception processor 2148. The MCS selected by the MCS selector 2144 is input to the encoding processor $20830_1$ through the encoding processor $20830_N$ and the modulation processor $20832_1$ through the modulation processor $20832_N$.

The RB assigner 2142 is connected to the CQI reception processor 2148. The RB assigner 2142 may set the RB to be assigned to the user terminal 100 based on the CQI reported from the CQI reception processor 2148 and the estimation result of the moving speed of the user terminal 100 reported from the moving speed estimator 2143.

The RB assigner 2142 inputs RB assignment information to the MAC processor $20828_N$, the RB assignment information indicating the RB to be assigned.

Further, upon receiving the information from the Shared TA Command setter 2152 indicating there is a user terminal included in the Shared Timing Advance (TA) Command Group, the RB assigner 2142 assigns a radio resource to the Shared Timing Advance (TA) Command to be transmitted to the Shared Timing Advance (TA) Command Group.

The radio resource is shared by the Shared Timing Advance (TA) Command Group. The RB assigner 2142 inputs the RB assignment information to the MAC processor $20828_N$, the RB assignment information indicating the RB to be assigned to the Shared Timing Advance (TA) Command Group.

Further, upon receiving the information from the Shared TA Command setter 2152 indicating the user terminal selected as the user terminal to be excluded from the Shared Timing Advance (TA) Command Group, the RB assigner 2142 assigns a radio resource to the Shared Timing Advance (TA) Command to be transmitted to the user terminals other than the user terminal selected as the user terminal to be excluded from the Shared Timing Advance (TA) Command Group from among the user terminals included in the Shared Timing Advance (TA) Command Group.

The Shared TA Command setter 2152 is connected to the RB assigner 2142, the moving speed estimator 2143, the timing detection processor 2146, the MCS selector 2144, and the CQI reception processor 2148.

Based on the information indicating the difference between the transmission timing of the uplink signal input to the timing detection processor 2146 and the transmission timing of the downlink signal of the base station 200, the Shared TA Command setter 2152 selects the user terminal having the uplink transmission timing that is not necessary to be adjusted.

The Shared TA Command setter 2152 sets the user terminal selected as the user terminal having the uplink transmission timing that is not necessary to be adjusted as the Shared Timing Advance (TA) Command Group. In this case, plural Shared Timing Advance (TA) Command Groups may be set.

When the plural Shared Timing Advance (TA) Command Groups are set, the Shared TA Command setter 2152 may classify the user terminals into the plural Shared Timing Advance (TA) Command Groups based on the CQI reported from the CQI reception processor 2148 and the estimation result of the moving speed f the user terminal reported from the moving speed estimator 2143.

Further, from among the user terminals of the Shared Timing Advance (TA) Command Group, the Shared TA Command setter 2152 may exclude a user terminal that is to receive a downlink signal in addition to the Shared Timing Advance (TA) Command to be transmitted from the base station.

Namely, the Shared TA Command setter 2152 selects the user terminal to which a downlink signal is to be transmitted. Then, the Shared TA Command setter 2152 selects the user terminal other than the user terminal selected as the user terminal to which the downlink signal is to be transmitted from among the user terminals included in the Shared Timing Advance (TA) Command Group.

The Shared TA Command setter 2152 reports the information indicating that there exists a user terminal included in the Shared Timing Advance (TA) Command Group to the RB assigner 2142, the Shared RNTI setter 2154, and the PUCCH resource setter 2156.

Further, the Shared TA Command setter 2152 reports the information to the RRC processor 22052 corresponding to the user terminal selected as the Shared Timing Advance (TA) Command Group from among the RRC processor $22052_1$ through the RRC processor $22052_N$.

Further, from among the user terminals included in the Shared Timing Advance (TA) Command Group, the Shared TA Command setter 2152 selects a user terminal corresponding to at least one of 1) the user terminal having generated user data, 2) a user terminal having the transmission timing that is determined by the timing detection processor 2146 to be necessary to be adjusted, and 3) the user terminal determined that the corresponding Physical Uplink Control Channel (PUCCH) and the Sounding Reference Signal (SRS) is to be released.

Then, the Shared TA Command setter 2152 determines the selected user terminal as the user terminal to be excluded from the Shared Timing Advance (TA) Command Group. The Shared TA Command setter 2152 inputs an instruction to the RRC processor 20822 corresponding to the user terminal selected as the user terminal to be excluded from the Shared Timing Advance (TA) Command Group from among the RRC processor 20822$_1$ through the RRC processor 20822$_N$, the instruction being to stop receiving the Shared Timing Advance (TA) Command.

The Shared TA Command setter 2152 inputs the information to the RB assigner 2142, the information indicating the user terminal selected as the user terminal to be excluded from the Shared Timing Advance (TA) Command Group.

The Shared RNTI setter 2154 is connected to the Shared TA Command setter 2152. The Shared RNTI setter 2154 sets the Shared RNTI to be assigned to the Shared Timing Advance (TA) Command Group. The Shared RNTI setter 2154 inputs the Shared RNTI to the RRC processor 20822 corresponding to the user terminal included in the Shared Timing Advance (TA) Command Group among the RRC processor 20822$_1$ through the RRC processor 20822$_N$.

The PUCCH resource setter 2156 is connected to the Shared RNTI setter 2154. The PUCCH resource setter 2156 sets a radio resource transmitting the Physical Uplink Control Channel (PUCCH) reporting the ACK/NACK to be transmitted from the user terminal included in the Shared Timing Advance (TA) Command Group and indicating whether the Shared Timing Advance (TA) Command is received.

Specifically, for example, the PUCCH resource setter 2156 may set a radio resource number of the Physical Uplink Control Channel (PUCCH). The PUCCH resource setter 2156 inputs the information indicating the radio resource of the Physical Uplink Control Channel (PUCCH) to the RRC processor 20822 and the ACK/NACK reception processor 2150, the RRC processor 20822 corresponding to the user terminal included in the Shared Timing Advance (TA) Command Group among the RRC processor 20822$_1$ through the RRC processor 20822$_N$.

Method of Assignment of Radio Resource of Physical Uplink Control Channel (PUCCH)

Figure 10:
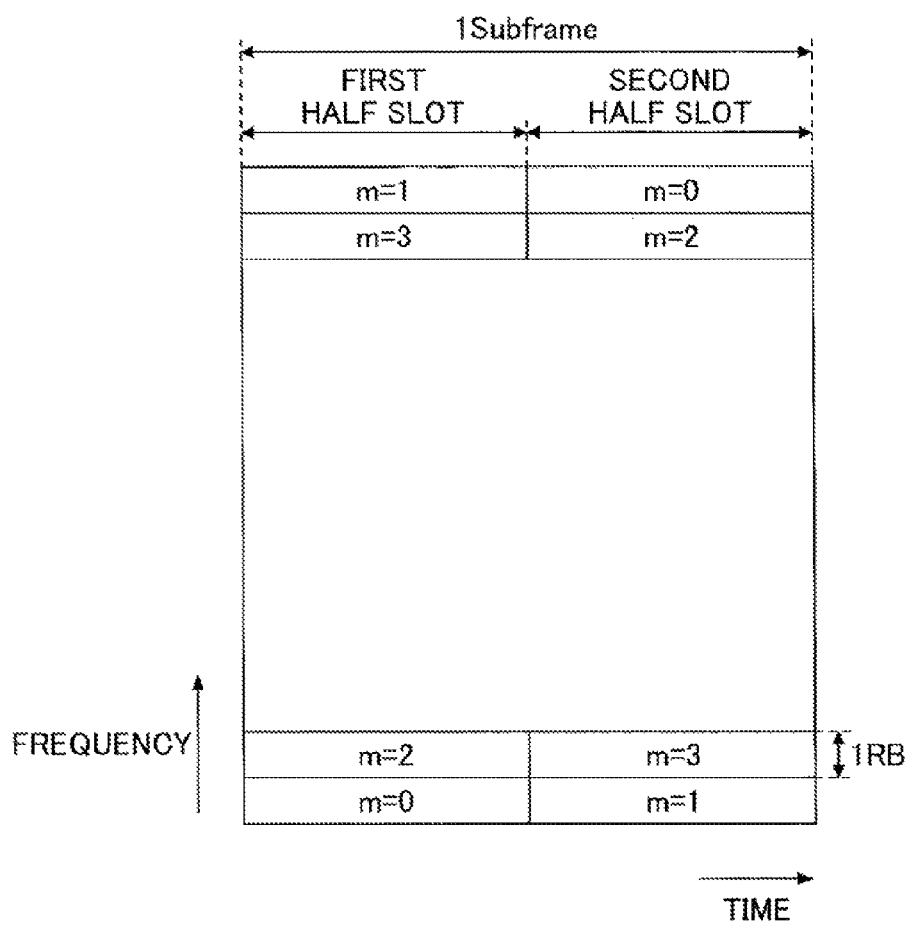
FIG. 10 illustrates an example radio resource to be assigned to a control channel according to an embodiment.

FIG. 10 illustrates an example method of the assignment of the radio resources of the Physical Uplink Control Channel (PUCCH) according to an embodiment. The method may be achieved with a standard configuration.

In the Physical Uplink Control Channel (PUCCH), user terminals are assigned to one RB. Namely, the Physical Uplink Control Channels (PUCCH) of the user terminals are multiplexed in one RB by performing a cyclic shift and using an orthogonal sequence.

Further, between the first half slot and the second half slot of one subframe, different RBs are used, and frequency hopping is performed. The Physical Uplink Control Channels (PUCCH) includes format1/1a/2a transmitting the ACK or the NACk and format2/2a/2b transmitting the CQI. Further, the Physical Uplink Control Channels (PUCCH) may include a mixed format where the format1/1a/1b and the format2/2a/2b are mixed in one RB.

The resource source number (m) of the Physical Uplink Control Channels (PUCCH) in the format1/1a/1b to be transmitted by the user terminal is determined based on the following formula (1).

$$m = \begin{cases} N_{RB}^{(2)} & \text{if } n_{PUCCH}^{(1)} < c \cdot \frac{N_{cs}^{(1)}}{\Delta_{shift}^{PUCCH}} \\ \left\lfloor \frac{\left| n_{PUCCH}^{(1)} - c \cdot \frac{N_{cs}^{(1)}}{\Delta_{shift}^{PUCCH}} \right|}{c \cdot \frac{N_{sc}^{RB}}{\Delta_{shift}^{PUCCH}}} \right\rfloor + N_{sc}^{(2)} + \left\lceil \frac{N_{cs}^{(1)}}{8} \right\rceil & \text{otherwise} \end{cases} \quad (1)$$

$$c = \begin{cases} 3 & \text{normal cyclic prefix} \\ 2 & \text{extended cyclic prefix} \end{cases}$$

Further, the resource source number (m) of the Physical Uplink Control Channels (PUCCH) in the format2/2a/2b to be transmitted by the user terminal is determined based on the following formula (2).

$$m = \lfloor n_{PUCCH}^{(2)}/N_{sc}^{RB} \rfloor \quad (2)$$

Here, the symbol "$N_{sc}^{RB}$" denotes the number of subcarriers in one RB (12 subcarriers). The symbol "$N_{RB}^{(2)}$" denotes the RB number of the radio resource of the Physical Uplink Control Channels (PUCCH) in the format2/2a/2b. The symbol "$N_{CS}^{(1)}$" denotes the RB number of the radio resource of the Physical Uplink Control Channels (PUCCH) in the mix format.

The symbol "$\Delta_{SHIFT}^{PUCCH}$" denotes the shift number which is necessary when SR/ACK/NACK is code-multiplexed. The symbol "$n_{PUCCH}^{(2)}$" denotes an index of the radio resource of the Physical Uplink Control Channels (PUCCH) in the format2/2a/2b.

The index is set for each of the user terminals. The "$n_{PUCCH}^{(1)}$" is calculated based on $n_{PUCCH}^{(1)} = n_{CCE} + N_{PUCCH}^{(1)}$. Here, the symbol "$n_{CCE}$" denotes an index of the Downlink Control Information (DCI) reported to the user terminal. The symbol "$N_{PUCCH}^{(1)}$" denotes a starting value of a range of "$n_{PUCCH}^{(1)}$"

The minimum value of the "$n_{CCE}$" is zero. Therefore, by setting $N_{PUCCH}^{(1)} \geq 1$, unassigned space may be reserved (secured) in "$n_{PUCCH}^{(1)}$" less than $N_{PUCCH}^{(1)}$. For example when $N_{PUCCH}^{(1)} = 4$, the "$n_{PUCCH}^{(1)}$" in a range from 0 to 3 is not used.

The PUCCH resource setter 2156 secures the radio resource transmitting the ACK/NACK in response to the Shared Timing Advance (TA) Command by the "$N_{PUCCH}^{(1)}$". The PUCCH resource setter 2156 allocates the unused "$n_{PUCCH}^{(1)}$" to the user terminal receiving the Shared Timing Advance (TA) Command.

The base station 200 reports the unused "$n_{PUCCH}^{(1)}$" to the user terminal. Upon receiving the Shared Timing Advance (TA) Command, the user terminal transmits the ACK/NACK using the reported "$n_{PUCCH}^{(1)}$" without using the "$n_{PUCCH}^{(1)}$" calculated based on the formula $n_{PUCCH}^{(1)} = n_{CCE} + N_{PUCCH}^{(1)}$.

Next, an example of the assignment of the radio resources of the Physical Uplink Control Channels (PUCCH) when user data are transmitted to three user terminals (A to C) and the Shared Timing Advance (TA) Command is transmitted to ten user terminals (D to M) in one subframe is described.

FIG. 11 illustrates various parameters.

In the example of FIG. 11, the number of user terminals receiving the Physical Downlink Shared Channel (PDSCH) of the subframe (i.e., the PDSCH receiving user terminal number of the subframe) is 13.

This is because the number of the user terminals receiving the user data (user data receiving user terminal number) is three (user terminals A-C), and the number of the user terminals receiving the Shared Timing Advance (TA) Command (Shared Timing Advance (TA) Command receiving user terminal number) is ten (user terminals D-M)

Further, the "$n_{CCE}$" reported to the user terminal A is zero. The "$n_{CCE}$" reported to the user terminal B is nine. The "$n_{CCE}$" reported to the user terminal C is fifteen. The "$n_{CCE}$" reported to the user terminals D-M is seven. The "$n_{PUCCH}^{(1)}$" reported to the user terminals D-M denote 0, 1, 2, 3, 4, 5, 6, 7, 8, and 9. The "$N_{RB}^{(2)}$" denotes two. The "$N_{CS}^{(1)}$" denotes zero. The "$\Delta_{SHIFT}^{PUCCH}$" denotes one, and $N_{PUCCH}^{(1)}$ denotes thirty.

FIG. 12 illustrates example RB numbers (m) of the radio resources transmitting the ACK/NACK from the user terminals.

In user terminal A, the received "$n_{CCE}$" is zero. Therefore, "$n_{PUCCH}^{(1)}$=30 and m=2. As a result, the user terminal A transmits the ACK or the NACK using the radio resource corresponding to the RB number 2. In user terminal B, the received "$n_{CCE}$" is nine.

Therefore, "$n_{PUCCH}^{(1)}$=39 and m=3. As a result, the user terminal B transmits the ACK or the NACK using the radio resource corresponding to the RB number 3. In user terminal C, the received "$n_{CCE}$" is fifteen. Therefore, "$n_{PUCCH}^{(1)}$=45 and m=3. As a result, the user terminal C transmits the ACK or the NACK using the radio resource corresponding to the RB number 3.

In user terminals D-M, the Downlink Control Information (DCI) is received with "$n_{CCE}$" as seven. However, due to the case of the Shared Timing Advance (TA) Command, as described above, "m" is calculated based on the reported "$n_{PUCCH}^{(1)}$". As a result, m=2 is obtained. Therefore, the user terminals D-M transmit the ACK or the NACK using the radio resource corresponding to the RB number 2.

Figure 13:
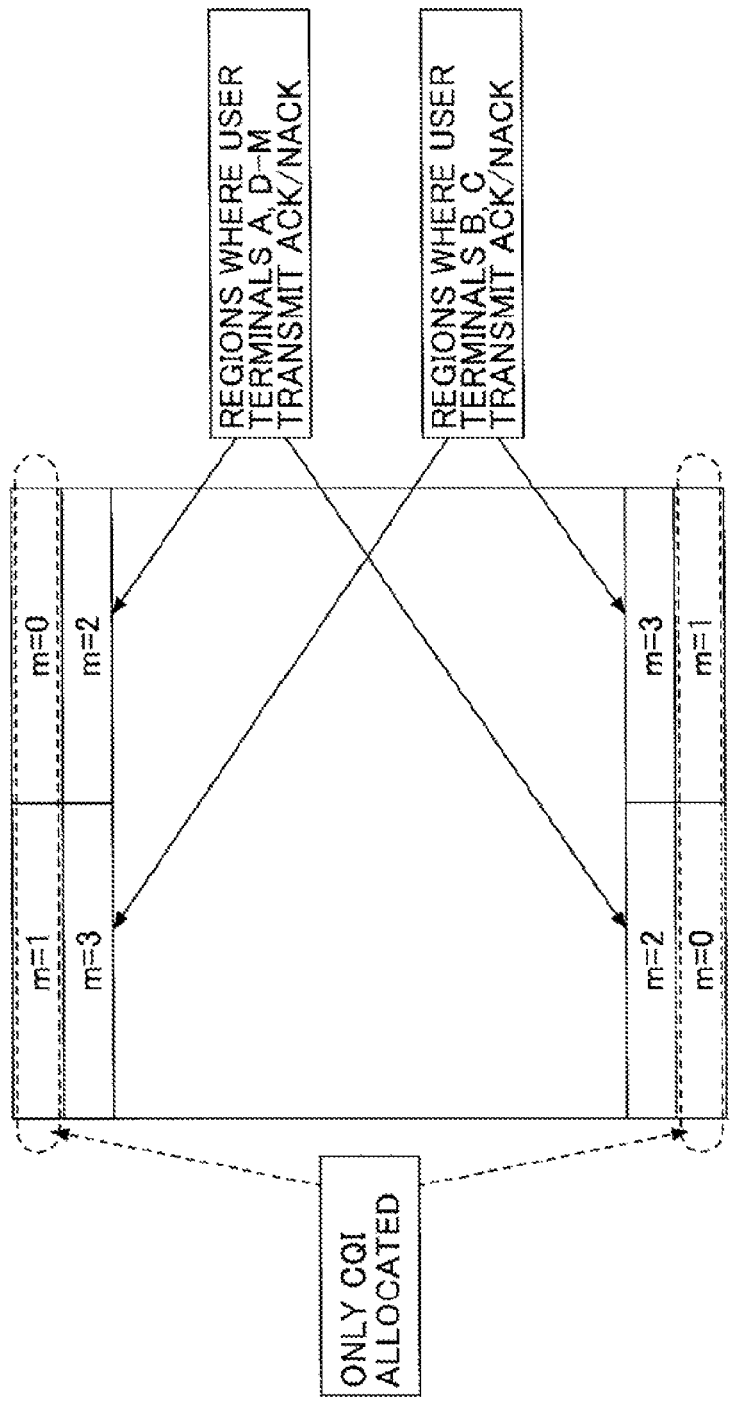
FIG. 13 illustrates an example radio resource to be assigned to the control channel according to an embodiment.

FIG. 13 illustrates an example Physical Uplink Control Channel (PUCCH) to be received by the base station 200. In this case, "$N_{RB}^{(2)}$" is two. Therefore, one RB at each of the both ends of the uplink signal is reserved for CQI transmission.

Accordingly, the base station 200 receives the CQI by using the radio resources corresponding to the resource numbers where m=0 and m=1. The base station 200 receives the Physical Uplink Control Channels (PUCCH) where the ACK/NACK transmitted from the user terminals A and D through M using the areas of the radio resources corresponding to the resource number where m=2 and the ACK/NACK transmitted from the user terminals B and C using the areas of the radio resources corresponding to the resource number where m=3 are multiplexed.

The ACK/NACK reception processor 2150 is connected to the PUCCH resource setter 2156. The ACK/NACK reception processor 2150 performs a process of receiving the ACK or the NACK from the user terminal using the radio resource set by the PUCCH resource setter 2156.

User Terminal

Figure 14:
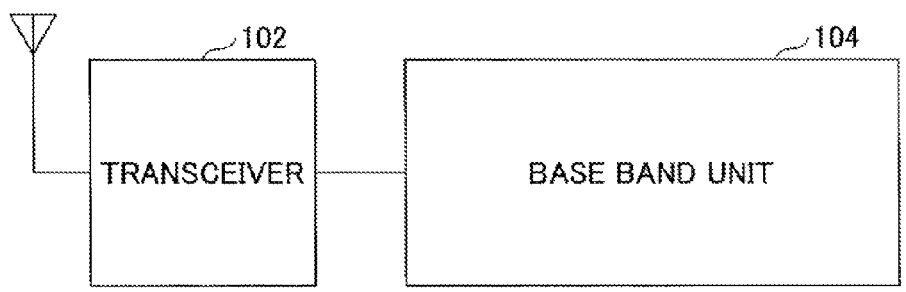
FIG. 14 illustrates an example configuration of the user terminal according to an embodiment.

FIG. 14 schematically illustrates an example user terminal 100 according to an embodiment. Specifically, FIG. 14 illustrates an example hardware configuration of the user terminal 100.

As illustrated in FIG. 14, the base station 200 includes a transceiver 102, a base band unit (BBU) 104 connected to the transceiver 102.

The transceiver 102 transmits and receives a radio signal to and from the base station 200. The radio signal received by an antenna is amplified and input to the transceiver 102. The transceiver 102 performs frequency conversion on the radio signal and inputs the signal to the base band unit 104. Further, the transceiver 102 converts a signal from the base band unit 104 into a radio signal and externally transmits via the antenna.

The base band unit 104 includes one or more Central Processing Units (CPUs). Further, the base band unit 104 may include one or more DSPs. The base band unit 104 performs call control. The base band unit 104 further performs protocol control.

The base band unit 104 further performs a baseband process. The baseband signal on which the baseband process is performed by the base band unit 104 is converted into a radio signal by an RF section (not shown) to be wirelessly transmitted to the base station 200.

Functions of User Terminal

Figure 15:
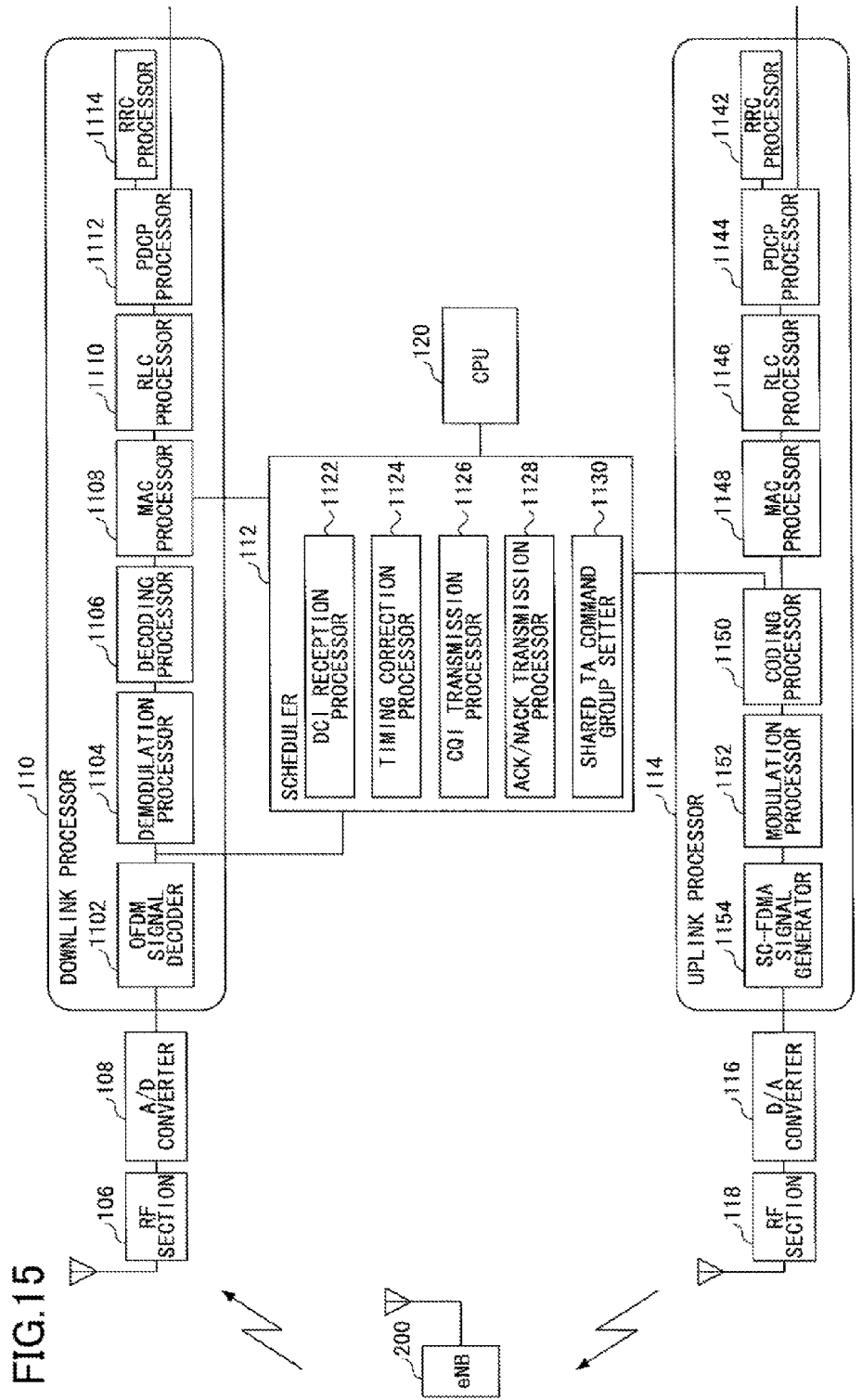
FIG. 15 illustrates an example configuration of the user terminal according to an embodiment.

FIG. 15 is an example functional block diagram of the user terminal 100 according to an embodiment. More specifically, FIG. 15 illustrates example functions of the transceiver 102 and the base band unit 104.

As illustrated in FIG. 15, the user terminal 100 includes an RF section 106, an A/D converter 108, a downlink processor 110, a scheduler 112, an uplink processor 114, a D/A converter 116, an RF section 118, and a CPU 120.

The downlink processor 110 includes an OFDM signal decoder 1102, a demodulation processor 1104, a decoding processor 1106, a MAC processor 1108, an RLC processor 1110, a PDCP processor 1112, and an RRC processor 1114.

The uplink processor 114 includes an RRC processor 1142, a PDCP processor 1144, an RLC processor 1146, a MAC processor 1148, a coding processor 1150, a modulation processor 1152, and an SC-FDMA signal generator 1154.

The scheduler 112 includes a DCI reception processor 1122, a timing correction processor 1124, a CQI transmission processor 1126, an ACK/NACK transmission processor 1128, and a Shared Timing Advance (TA) Command group setter 1130.

The RF section 106 performs down-conversion on a radio-frequency signal received by an antenna and inputs the down-converted signal to the A/D converter 108.

The A/D converter 108 is connected to the RF section 106. The A/D converter 108 converts the down-converted signal from the RF section 106 into a baseband signal, and inputs the baseband signal to the OFDM signal decoder 1102.

The OFDM signal decoder 1102 is connected to the A/D converter 108. The OFDM signal decoder 1102 demodulates the baseband signal from the A/D converter 108. Specifically, the OFDM signal decoder 1102 determines whether the Physical Downlink Control Channel (PDCCH) includes the Downlink Control Information (DCI) to the user terminal 100. The OFDM signal decoder 1102 descrambles (decodes) the Downlink Control Information (DCI) by using the C-RNTI or the Shared RNTI reported from the base station 200.

The OFDM signal decoder 1102 inputs the decoded Downlink Control Information (DCI) to the DCI reception processor 1122 of the scheduler 112. When determining that there is no Downlink Control Information (DCI) for the user terminal 100, the OFDM signal decoder 1102 does not perform the processes described below. On the other hand, when determining that there exists the Downlink Control Information (DCI) to the user terminal 100, the OFDM signal decoder 1102 inputs the baseband signal (Physical Downlink Shared Channel (PDSCH)) to the demodulation processor 1104.

The demodulation processor 1104 is connected to the OFDM signal decoder 1102. The demodulation processor 1104 demodulates the baseband signal from the OFDM signal decoder 1102.

Specifically, the demodulation processor 1104 demodulates the Physical Downlink Shared Channel (PDSCH) based on the Downlink Control Information (DCI) demodulated by the OFDM signal decoder 1102. The demodulation processor 1104 inputs the demodulated Physical Downlink Shared Channel (PDSCH) to the decoding processor 1106.

The decoding processor 1106 is connected to the demodulation processor 1104. The decoding processor 1106 decodes the demodulated Physical Downlink Shared Channel (PDSCH) from the demodulation processor 1104. The decoding processor 1106 inputs the decoded Physical Downlink Shared Channel (PDSCH) to the MAC processor 1108.

The MAC processor 1108 is connected to the decoding processor 1106. The MAC processor 1108 performs a process on the signal from the decoding processor 1106 as the MAC PDU, and converts the signal into the MAC SDU. The MAC processor 1108 inputs the MAC SDU to the RLC processor 1110.

When the Timing Advance (TA) Command or the Shared Timing Advance (TA) Command is included in the signal from the decoding processor 1106, the MAC processor 1108 inputs the Timing Advance (TA) Command or the Shared Timing Advance (TA) Command to the timing correction processor 1124 of the scheduler 112.

The RLC processor 1110 is connected to the MAC processor 1108. The RLC processor 1110 performs a process on the data transferred from the MAC processor 1108 as the RLC SDU, and converts the data into the RLC PDU. The RLC processor 1110 transfers the RLC PDU to the PDCP processor 1112.

The PDCP processor 1112 is connected to the RLC processor 1110. The PDCP processor 1112 performs a process on the data transferred from the RLC processor 1110 as the PDCP SDU. When the received data include the RRC message, the PDCP processor 1112 transfers the RRC message to the RRC processor 1114. When no RRC message is included in the received data, the PDCP processor 1112 outputs the uplink data.

The RRC processor 1114 is connected to the PDCP processor 1112. The RRC processor 1114 performs a process based on the RRC message transferred from the PDCP processor 1112.

In the uplink processor 114, a process is performed based on the information included in the Physical Downlink Control Channel (PDCCH) to transmit the uplink signal.

When the RRC message exists, the RRC processor 1142 transfers the RRC message to the PDCP processor 1144.

The PDCP processor 1144 is connected to the RRC processor 1142. The PDCP processor 1144 performs a process on the data transferred from the RRC processor 1142 or the uplink data as the PDCP SDU, and converts the data into the PDCP PDU. The PDCP processor 1144 transfers the PDCP PDU to the RLC processor 1146.

The RLC processor 1146 is connected to the PDCP processor 1144. The RLC processor 1146 performs a process on the data transferred from the PDCP processor 1144 as the RLC SDU, and converts the data into the RLC PDU. The RLC processor 1146 transfers the RLC PDU to the MAC processor 1148.

The MAC processor 1148 is connected to the RLC processor 1146. The MAC processor 1148 performs a process on the data transferred from the RLC processor 1146 as the MAC SDU, and converts the data into the MAC PDU. The MAC processor 1148 inputs the MAC PDU to the coding processor 1150.

The coding processor 1150 is connected to the MAC processor 1148. The coding processor 1150 performs error correction coding and scrambling on the data transferred from the MAC processor 1148, the CQI input from the CQI transmission processor 1126, and the ACK or the NACK input from the ACK/NACK transmission processor 1128.

The coding processor 1150 controls the transmission timing of the uplink signal based on a correction value obtained in accordance with the Timing Advance (TA) Command or the Shared Timing Advance (TA) Command input from the scheduler 112. The coding processor 1150 transferred the scrambled data to the modulation processor 1152.

The modulation processor 1152 is connected to the coding processor 1150. The modulation processor 1152 converts the signal from the coding processor 1150 into a modulation signal, and transfers the modulation signal to the SC-FDMA signal generator 1154.

The SC-FDMA signal generator 1154 is connected to the modulation processor 1152. The SC-FDMA signal generator 1154 generates an SC-FDMA signal based on the modulation signal from the modulation processor 1152. The SC-FDMA signal generator 1154 inputs the SC-FDMA signal to the D/A converter 116.

The D/A converter 116 is connected to the SC-FDMA signal generator 1154. The D/A converter 116 performs a D/A conversion on the signal from the SC-FDMA signal generator 1154, and inputs the D/A converted signal to the RF section 118.

The RF section 118 is connected to the D/A converter 116. The RF section 118 converts the signal from the D/A converter 116 into a radio-frequency signal, and transmits the radio-frequency signal to the base station via a transmission antenna.

The RRC processor 1142 generates the RRC message when the RRC message exists to be transmitted to the base station 200. The RRC message generated by the RRC processor 1142 is sequentially processed by the PDCP processor 1144, the RLC processor 1146, and the MAC processor 1148 in this order.

Then, the RRC message is encoded by the coding processor 1150 and modulated by the modulation processor 1152. Then, by the SC-FDMA signal generator 1154, the SC-FDMA signal is generated based on the modulated signal of the RRC message, D/A converted, and converted into a radio frequency signal to be transmitted to the base station 200.

The DCI reception processor 1122 performs a process to received the Downlink Control Information (DCI) from the downlink signal transmitted from the base station 200. Specifically, by using the C-RNTI or the Shared RNTI reported from the base station 200, the DCI reception processor 1122 descrambles (decodes) the Downlink Control Information (DCI).

The timing correction processor 1124 performs a process to correct the transmission timing of the uplink signal based on the Timing Advance (TA) Command or the Shared Timing Advance (TA) Command input from the MAC processor 1108. Namely, the timing correction processor 1124 calculates the correction value to correct the transmission timing of the uplink signal. The timing correction processor 1124 inputs the correction value to the coding processor 1150.

The CQI transmission processor 1126 acquires the received quality of the downlink signal transmitted from the base station, and performs a process to transmit the information indicating the received quality. The CQI transmission processor 1126 inputs the CQI to the coding processor 1150.

The ACK/NACK transmission processor 1128 performs a process to transmit the ACK (ACKnowledgement) or NACK (Negative-ACKnowledgement) indicating whether the downlink signal is received. The downlink signal includes the Timing Advance (TA) Command and the Shared Timing Advance (TA) Command. The ACK/NACK transmission processor 1128 inputs the ACK or the NACK to the coding processor 1150.

Upon receiving a report indicating that the user terminal 100 is set as the Shared Timing Advance (TA) Command Group, the Shared Timing Advance (TA) Command group setter 1130 sets the information indicating the radio resources to transmit the Shared RNTI to receive the Downlink Control Information (DCI) received upon the reception of the Shared Timing Advance (TA) Command and the ACK/NACK as a response to the Shared Timing Advance (TA) Command. The information indicating the radio resources includes the RB numbers. Operation (No.1) by base station FIG. 16 is an example flowchart of an operation (No.1) of the base station 200.

Figure 16:
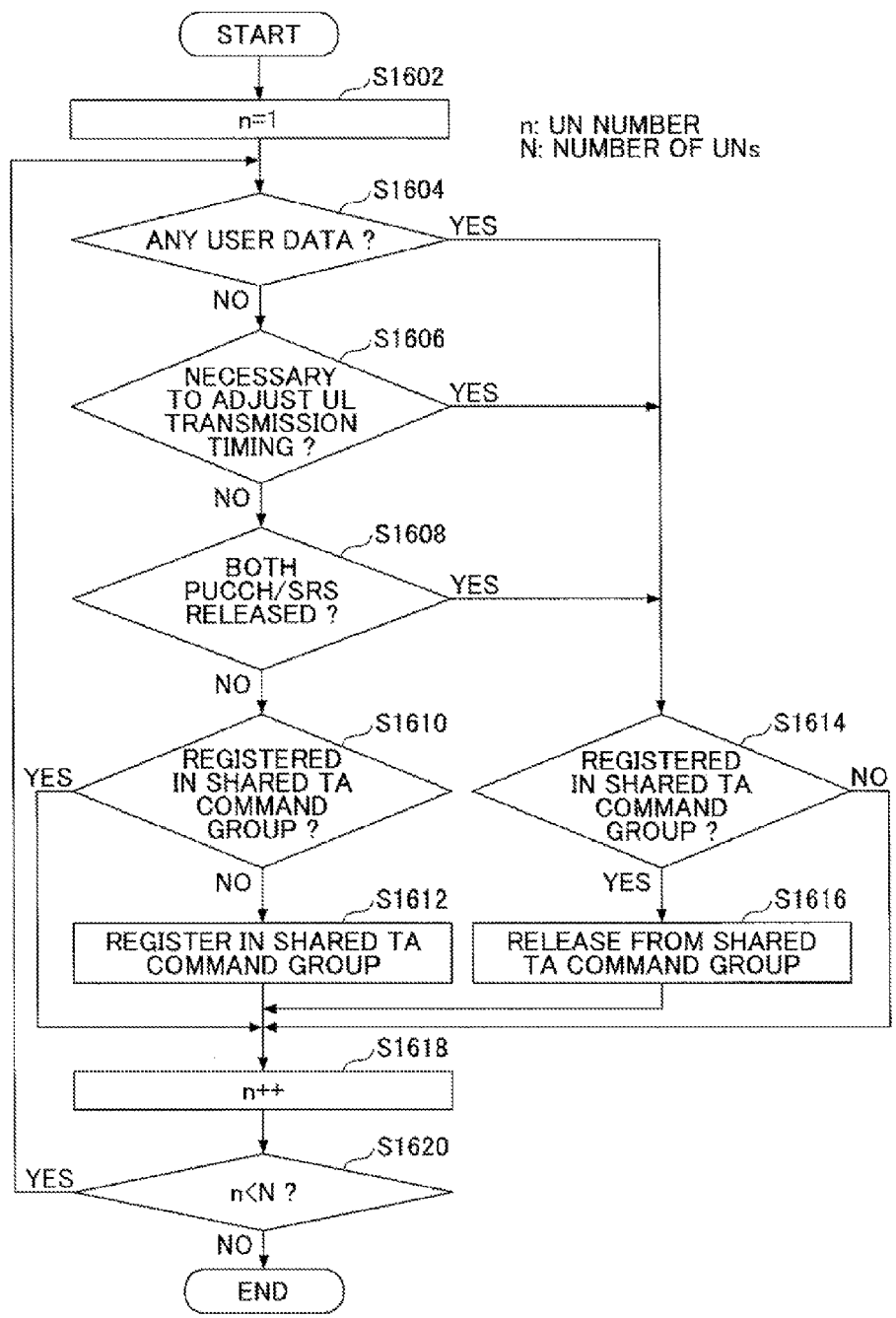
FIG. 16 is an example flowchart of an operation of the base station according to an embodiment.

Specifically, FIG. 16 illustrates an example of a process of determining whether the user terminal is included in the Shared Timing Advance (TA) Command Group. The process of determining whether the user terminal is included in the Shared Timing Advance (TA) Command Group is mainly executed by the Shared TA Command setter 2152. In FIG. 16, the symbol "n" denotes the identification number of the user terminal, and the symbol "N" denotes the total number of the user terminals.

The base station 200 sets "1" to "n" indicating the identification number of the user terminal (step S1602).

The base station 200 determines whether there are user data relevant to the user terminal (step S1604). The user data may be, for example, a downlink signal directed to the user terminal, or an uplink signal to be transmitted from the user terminal.

When determining that there are no data relevant to the user terminal (NO in step S1604), the base station 200 determines whether it is necessary to adjust (correct) the transmission timing of the uplink signal from the user station (step S1606).

When determining that it is not necessary to adjust the transmission timing of the uplink signal (NO in step S1606), the base station 200 determines whether it is not a case where both of the Physical Uplink Control Channels (PUCCH) and the Sounding Reference Signal (SRS) are released, in other words, the base station 200 determines whether it is a case where at least one of the Physical Uplink Control Channels (PUCCH) and the Sounding Reference Signal (SRS) is not released (step S1608).

With respect to the user terminal, when determining that at least one of the Physical Uplink Control Channels (PUCCH) and the Sounding Reference Signal (SRS) is not released (NO in step S1608), the user terminal further determines whether the user terminal is registered in the Shared Timing Advance (TA) Command Group (step S1610).

When determining that the user terminal is registered in the Shared Timing Advance (TA) Command Group (NO in step S1610), the base station registers the user terminal in the Shared Timing Advance (TA) Command Group (step S1612).

When determining that there are user data relevant for the user terminal (YES in step S1604), when further determining that it is necessary to adjust the transmission timing of the uplink signal (YES in step S1606), and when further determining that both Physical Uplink Control Channels (PUCCH) and the Sounding Reference Signal (SRS) are released (YES in step S1608), the base station 200 determines whether the user terminal is registered in the Shared Timing Advance (TA) Command Group (step S1614).

When determining that the user terminal is registered in the Shared Timing Advance (TA) Command Group (YES in step S1614), the base station 200 excludes the user terminal from the Shared Timing Advance (TA) Command Group (step S1616).

When determining that the user terminal is registered in the Shared Timing Advance (TA) Command Group (YES in step S1610), when the user terminal is registered in the Shared Timing Advance (TA) Command Group (step S1612), when the user terminal is released (excluded) from the Shared Timing Advance (TA) Command Group (step S1616), or when determining that the user terminal is not registered in the Shared Timing Advance (TA) Command Group (step S1614), the base station 200 increments "n" denoting the identification number of the user terminal (step S1618).

The base station 200 determines whether "n" denoting the identification number of the user terminal is less than "N" denoting the total number of the user terminals (step S1620).

When determining that "n" denoting the identification number of the user terminal is less than "N" denoting the total number of the user terminals (YES in step S1620), the process goes back to step S1604. Otherwise, namely, when it is not determined that "n" denoting the identification number of the user terminal is less than "N" denoting the total number of the user terminals (NO in step S1620), the process ends.

The process of steps S1602 through S1620 is repeated for each of the existing user terminals for each subframe.
Operation (No.2) by Base Station FIG. 17 is an example flowchart of an operation (No.2) of the base station 200.

Figure 17:
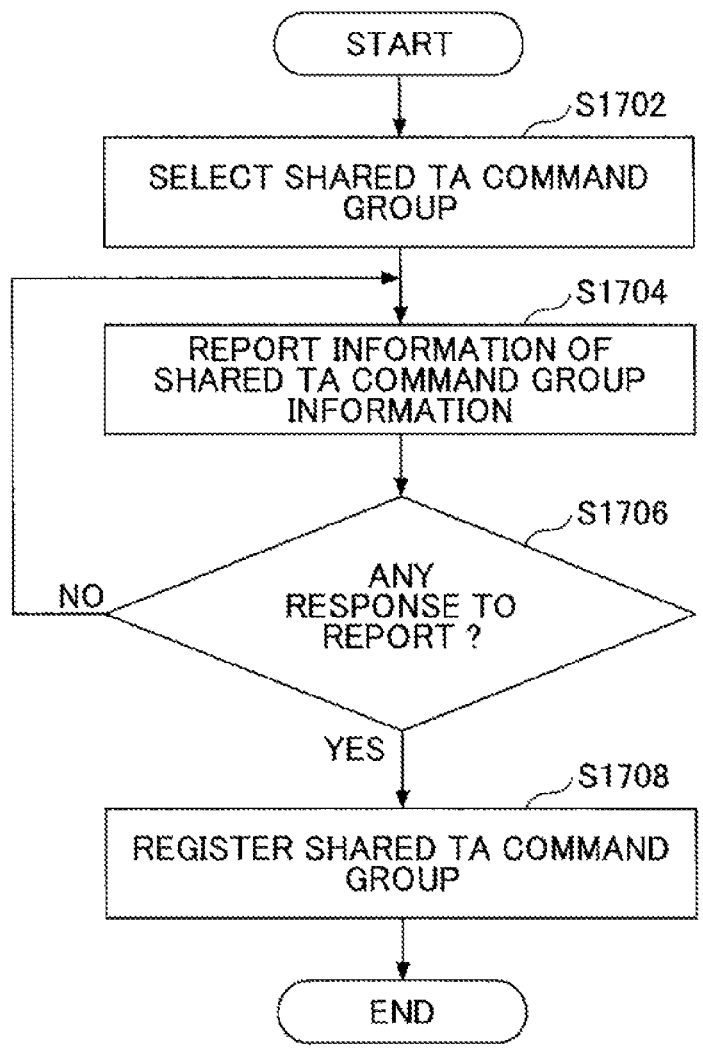
FIG. 17 is an example flowchart of an operation of the base station according to an embodiment.

Specifically, FIG. 17 illustrates an example of a process of registering the user terminal in the Shared Timing Advance (TA) Command Group. The process of registering the user terminal in the Shared Timing Advance (TA) Command Group is mainly executed by the Shared TA Command setter 2152.

The base station 200 selects the Shared Timing Advance (TA) Command Group in which the user terminal is to be registered (step S1702).

Specifically, the Shared TA Command setter 2152 may select the Shared Timing Advance (TA) Command Group based on the CQI reported from the user terminal and the moving speed of the user terminal. Further, when selecting the Shared Timing Advance (TA) Command Group in which the user terminal is to be registered, the Shared TA Command setter 2152 secures the Shared RNTI to be used to scramble the Shared Timing Advance (TA) Command.

Further, when selecting the Shared Timing Advance (TA) Command Group in which the user terminal is to be registered, the Shared TA Command setter 2152 determines the information (e.g., the RB number) indicating the radio resource of the Physical Uplink Control Channels (PUCCH) to transmit the ACK or the NACK in response to the Shared Timing Advance (TA) Command by the user terminal.

FIG. 18 is an example table to used when selecting the Shared Timing Advance (TA) Command Group to which the user terminal is to be registered. According to FIG. 18, there are provided twelve Shared Timing Advance (TA) Command Groups depending on the combination between the CQI and the estimation value of the moving speed.

However, the number of the Shared Timing Advance (TA) Command Groups to be provided (set) is not limited to twelve. Namely, the number of the Shared Timing Advance (TA) Command Groups to be provided (set) may be in a range from one to eleven or more than twelve. Further, any appropriate value or any combination of appropriate information items other than the combination between the CQI and the moving speed may alternatively be used.

Further, for example, the Shared Timing Advance (TA) Command Group may be selected based only on one of the CQI, the estimation value of the moving speed, and any appropriate information other than the CQI and the estimation value of the moving speed.

The base station 200 reports the information indicating the Shared Timing Advance (TA) Command Group selected in step S1702, the Shared RNTI, and the RB number of the radio resource of the Physical Uplink Control Channels (PUCCH) to transmit the ACK or the NACK to the user terminal using the RRC message.

Specifically, the information indicating the Shared Timing Advance (TA) Command Group set by the Shared TA Command setter 2152, the Shared RNTI set by the Shared RNTI setter 2154, and the information indicating the RB number of the radio resource of the Physical Uplink Control Channels (PUCCH) to transmit the ACK or the NACK set by the PUCCH resource setter 2156 are input in the RRC processor 20822 corresponding to the user terminal among the RRC processor 20822$_1$ through the RRC processor 20822$_N$, processed according to a predetermined process, and reported to the user terminal using the RRC message.

The base station 200 determines whether the response to the RRC message reported in step S1704 is received (step S1706). Specifically, the ACK/NACK reception processor 2150 determines whether the response to the RRC message reported in step S1704 is received. The ACK/NACK reception processor 2150 starts a timer when the RRC message is reported in step S1704. The ACK/NACK reception processor 2150 determines that the response is received when the response is received before the time is terminated.

When determining that no response is received (NO in step S1706), the process goes back to step S1704 and the base station 200 transmits the RRC message again.

When determining that the response is received (YES in step S1706), the base station 200 registers the user terminal in the Shared Timing Advance (TA) Command Group (step S1708). The Shared TA Command setter 2152 registers the user terminal in the Shared Timing Advance (TA) Command Group. Namely, the base station 200 manages the user terminal as the Shared Timing Advance (TA) Command Group, and the process ends. Operation (No.3) by base station FIG. 19 is an example flowchart of an operation (No.3) of the base station 200.

Figure 19:
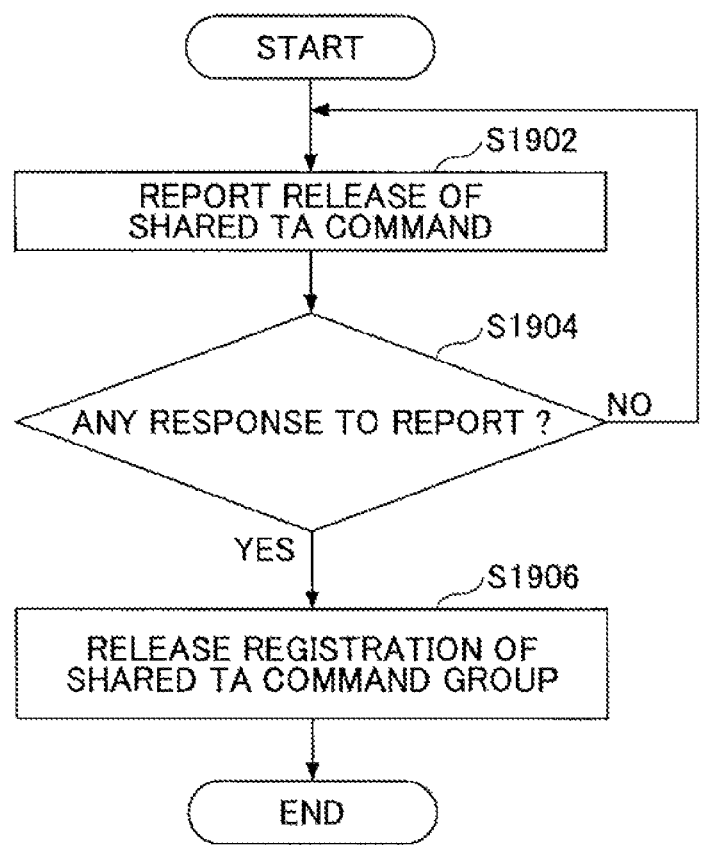
FIG. 19 is an example flowchart of an operation of the base station according to an embodiment.

Specifically, FIG. 19 illustrates an example of a process of releasing (excluding) the user terminal from the Shared Timing Advance (TA) Command Group. The process of releasing the user terminal from the Shared Timing Advance (TA) Command Group is mainly executed by the Shared TA Command setter 2152.

The base station 200 instructs the user terminal to be released from the Shared Timing Advance (TA) Command Group to stop receiving the Shared Timing Advance (TA) Command (step S1902). Specifically, the Shared TA Command setter 2152 generates the information to instruct the user terminal to be released from the Shared Timing Advance (TA) Command Group to stop receiving the Shared Timing Advance (TA) Command.

The generated information is input to the RRC processor 20822 corresponding to the user terminal to be released from the Shared Timing Advance (TA) Command Group among the RRC processor 20822$_1$ through the RRC processor 20822$_N$, processed according to a predetermined process, and reported to the user terminal using the RRC message.

The base station 200 determines whether the response to the RRC message reported in step S1902 is received (step S1904). Specifically, the ACK/NACK reception processor 2150 determines whether the response to the RRC message reported in step S1904 is received.

The ACK/NACK reception processor 2150 starts a timer when the RRC message is reported in step S1902. The ACK/NACK reception processor 2150 determines that the response is received when the response is received before the time is terminated.

When determining that no response is received (NO in step S1904), the process goes back to step S1902 and the base station 200 transmits the RRC message again.

When determining that the response is received (YES in step S1904), the base station 200 releases the registration of the user terminal from the Shared Timing Advance (TA) Command Group (step S1906). The Shared TA Command setter 2152 releases the registration of the user terminal from the Shared Timing Advance (TA) Command Group. Operation (No.1) by user terminal FIG. 20 is an example flowchart of an operation (No.1) of the user terminal 100.

Figure 20:
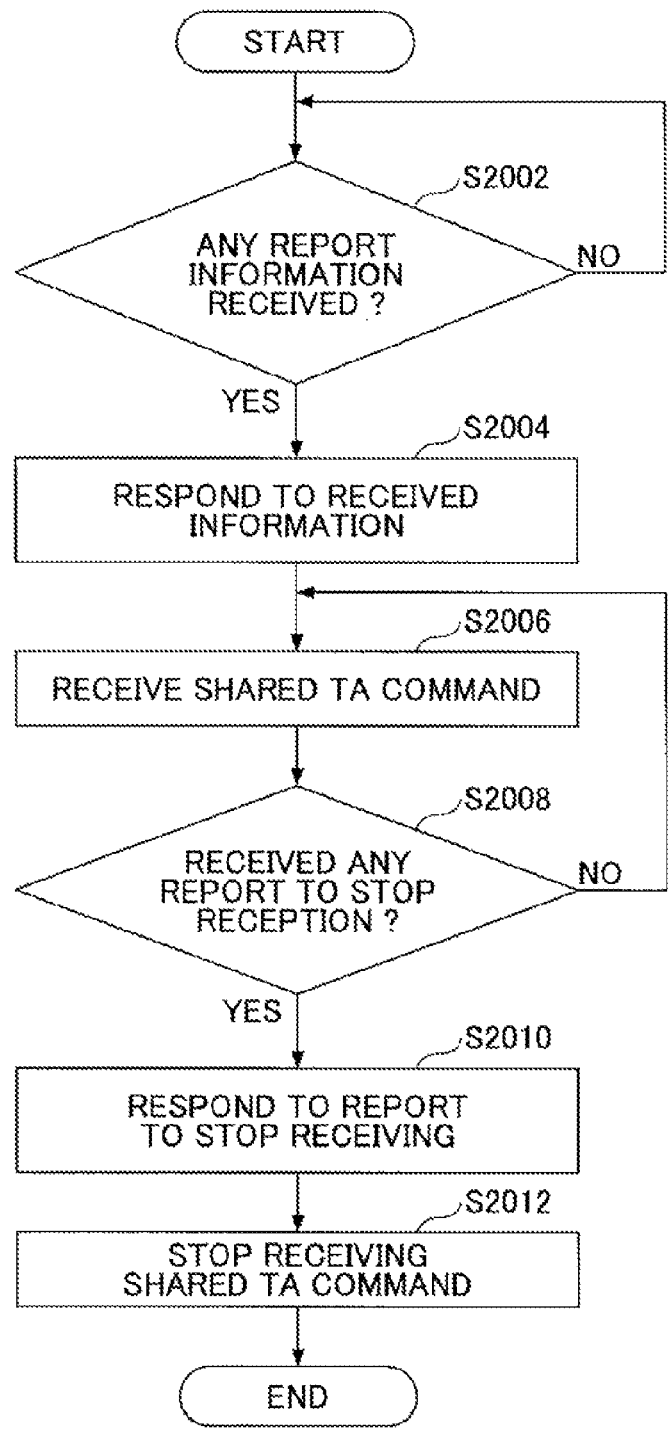
FIG. 20 is an example flowchart of an operation of the user terminal according to an embodiment.

Specifically, FIG. 20 illustrates an example of the processes of starting and stopping the reception of the Shared Timing Advance (TA) Command. The processes of starting and stopping the reception of the Shared Timing Advance (TA) Command are mainly executed by the downlink processor 110 and the Shared Timing Advance (TA) Command group setter 1130.

The user terminal 100 determines whether the report of the information indicating the Shared Timing Advance (TA) Command Group is received from the base station 200 (step S2002). Specifically, the Shared Timing Advance (TA) Command group setter 1130 determines whether the report of the information indicating the Shared Timing Advance (TA) Command Group is received from the base station 200.

When determining that no information indicating the Shared Timing Advance (TA) Command Group is received (NO in step S2002), the process goes back to step S2002.

When determining that the information indicating the Shared Timing Advance (TA) Command Group is received (YES in step S2002), the user terminal 100 sets the Shared Timing Advance (TA) Command based on the information indicating the Shared Timing Advance (TA) Command Group.

Along with the setting of the Shared Timing Advance (TA) Command, the user terminal 100 sets the Shared RNTI and the RB number which are also to be reported when the information indicating the Shared Timing Advance (TA) Command Group is reported, the RB number indicating the resource block of the Physical Uplink Control Channel (PUCCH) transmitting the ACK or the NACK.

The user terminal 100 responds to the reception of the information indicating the Shared Timing Advance (TA) Command Group (step S2004). Specifically, the Shared Timing Advance (TA) Command group setter 1130 sets the Shared Timing Advance (TA) Command based on the information indicating the Shared Timing Advance (TA) Command Group, and performs a process of transmitting the response to the reception of the Shared Timing Advance (TA) Command Group.

The user terminal 100 receives the Shared Timing Advance (TA) Command (step S2006). Specifically, the downlink processor 110 receives the Shared Timing Advance (TA) Command from the base station 200.

The user terminal determines whether the information is received from the base station, the information indicating the instruction to stop the reception of the Shared Timing Advance (TA) Command (step S2008). Specifically, the Shared Timing Advance (TA) Command group setter 1130 determines whether the information is received by the downlink processor 110, the information indicating the instruction to stop the reception of the Shared Timing Advance (TA) Command.

When determining that no information indicating the instruction to stop the reception of the Shared Timing Advance (TA) Command is received from the base station 200 (NO in step S2008), the process goes back to step S2006.

When determining that the information indicating the instruction to stop the reception of the Shared Timing Advance (TA) Command is received from the base station 200 (YES in step S2008), the user terminal 100 responds to the information indicating the instruction to stop the reception of the Shared Timing Advance (TA) Command (step S2010).

Specifically, when determining that the information indicating the instruction to stop the reception of the Shared Timing Advance (TA) Command is received by the downlink processor 110, the Shared Timing Advance (TA) Command group setter 1130 performs a process of responding to the information indicating the instruction to stop the reception of the Shared Timing Advance (TA) Command.

The user terminal stops the reception of the Shared Timing Advance (TA) Command (step S2012). Specifically, the Shared Timing Advance (TA) Command group setter 1130 stops receiving the Shared Timing Advance (TA) Command by releasing the setting of the Shared Timing Advance (TA) Command Group.

Operation (No.2) by User Terminal

Figure 21:
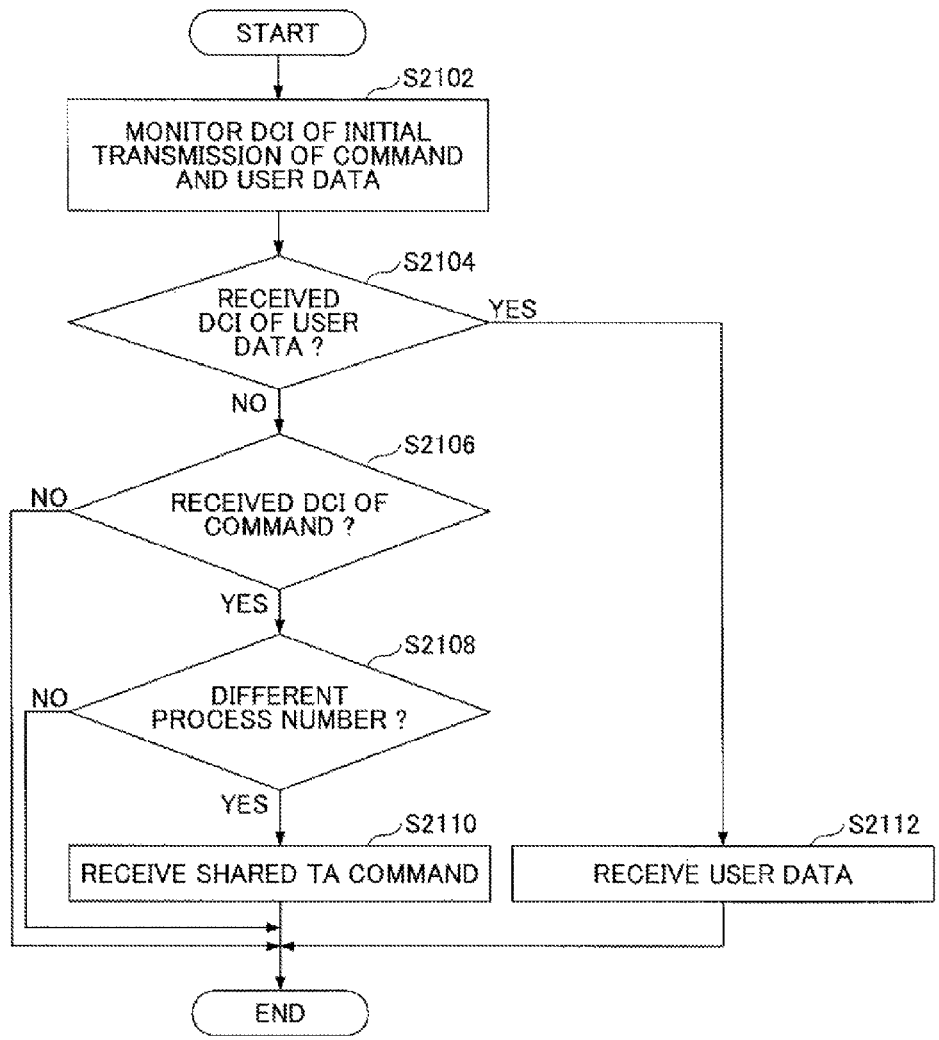
FIG. 21 is an example flowchart of an operation of the user terminal according to an embodiment.

FIG. 21 is an example flowchart of an operation (No.2) of the user terminal 100.

Specifically, FIG. 21 illustrates an example of the processes of starting the reception of the Shared Timing Advance (TA) Command by the user terminal 100.

The user terminal 100 monitors the initially transmitted Shared Timing Advance (TA) Command and the Downlink Control Information (DCI) of the user data (step S2102). Specifically, the Shared Timing Advance (TA) Command group setter 1130 monitors the Shared Timing Advance (TA) Command received by the downlink processor 110, and the DCI reception processor 1122 monitors the Downlink Control Information (DCI) of the downlink signal received by the downlink processor 110.

The user terminal 100 determines whether the Downlink Control Information (DCI) of the user data is received for each subframe (step S2104). Specifically, the DCI reception processor 1122 determines whether the Downlink Control Information (DCI) of the user data to be received by the downlink processor 110 is received.

When determining that no Downlink Control Information (DCI) of the user data is received (NO in step S2104), the user terminal 100 determines whether the Downlink Control Information (DCI) of the Shared Timing Advance (TA) Command is received (step S2106). Specifically, the Shared Timing Advance (TA) Command group setter 1130 determines whether the Downlink Control Information (DCI) of the Shared Timing Advance (TA) Command to be received by the downlink processor 110 is received.

When determining that the Downlink Control Information (DCI) of the Shared Timing Advance (TA) Command is received (YES in step S2106), the user terminal 100 further determines whether the process number included in the Downlink Control Information (DCI) of the (currently-received) Shared Timing Advance (TA) Command is different from the process number included in the Downlink Control Information (DCI) of the previously-received Shared Timing Advance (TA) Command (step S2108).

Specifically, the Shared Timing Advance (TA) Command group setter 1130 determines whether the process number included in the Downlink Control Information (DCI) of the (currently-received) Shared Timing Advance (TA) Command received by the downlink processor 110 is different from the process number included in the Downlink Control Information (DCI) of the previously-received Shared Timing Advance (TA) Command.

When determining that the process number included in the Downlink Control Information (DCI) of the (currently-received) Shared Timing Advance (TA) Command is different from the process number included in the Downlink Control Information (DCI) of the previously-received Shared Timing Advance (TA) Command (YES in step S2108), the user terminal 100 receives the (currently-received) Shared Timing Advance (TA) Command (step S2110).

Specifically, when determining that the process number included in the Downlink Control Information (DCI) of the Shared Timing Advance (TA) Command is different from the process number included in the Downlink Control Information (DCI) of the previously-received Shared Timing Advance (TA) Command, the Shared Timing Advance (TA) Command group setter 1130 performs a process of receiving the (currently-received) Shared Timing Advance (TA) Command.

When determining that the Downlink Control Information (DCI) of the user data is received (YES in step S2104), the user terminal 100 receives the user data based on the Downlink Control Information (DCI) (step S2112). Specifically, the DCI reception processor 1122 receives the Downlink Control Information (DCI) of the user data, and the downlink processor 110 receives the user data based on the Downlink Control Information (DCI) received by the DCI reception processor 1122.

When determining that no Downlink Control Information (DCI) of the Shared Timing Advance (TA) Command is received (no in step S2106), or when determining that the process number included in the Downlink Control Information (DCI) of the (currently-received) Shared Timing Advance (TA) Command is the same as the process number included in the Downlink Control Information (DCI) of the previously-received Shared Timing Advance (TA) Command (NO in step S2108), the process ends.

According to an embodiment, when there are plural user terminals to which the Timing Advance (TA) Commands are to be transmitted so as to avoid the termination of the time alignment timer, by sharing the Timing Advance (TA) Command among the user terminals, the consumption (use) of downlink radio resources may be reduced.

Namely, by sharing the radio resource of the Physical Downlink Shared Channel (PDSCH) among the user terminals to which the Timing Advance (TA) Commands are to be transmitted so as to avoid the termination of the time alignment timer, it may become possible to increase the radio resources that may be assigned to the user data. As a result of the increase of the radio resources assigned to the user data, it may become possible to improve the effective throughput.

Further, by sharing the Physical Downlink Control Channel (PDCCH) among the user terminals, the Physical Downlink Control Channel (PDCCH) being received when the Timing Advance (TA) Commands to be shared among the user terminals are received, it may become possible to reduce the energy consumption of transmission power of the Physical Downlink Shared Channel (PDSCH) of the base station.

All examples and conditional language recited herein are intended for pedagogical purposes to aid the reader in understanding the invention and the concepts contributed by the inventors to furthering the art, and are to be construed as being without limitation to such specifically recited examples and conditions, nor does the organization of such examples in the specification relate to a showing of superiority or inferiority of the invention.

Although the embodiments of the present inventions has been described in detail, it is to be understood that various changes, substitutions, and alterations could be made hereto without departing from the sprit and scope of the invention.

What is claimed is:

1. A base station comprising:
   a memory that stores instructions; and
   a processor that executes the instructions stored in the memory to implement
     a transmission timing adjustment determination unit configured to determine whether to adjust a transmission timing of an uplink signal for each of user terminals;
     a radio resource allocation unit configured to allocate a radio resource for instruction information to be transmitted to first ones of the user terminals for which it has been determined, by the transmission timing adjustment determination unit, that the transmission timing of the uplink signal is not to be adjusted, the instruction information indicating that the transmission timing of the uplink signal is not to be adjusted; and
     an instruction information transmission unit configured to transmit the instruction information to the first ones of the user terminals using the radio resource allocated by the radio resource allocation unit,
   wherein the radio resource allocation unit is configured to allocate the instruction information to the radio resource to be shared and used by the first ones of the user terminals.

2. The base station according to claim 1,
   wherein the transmission timing adjustment determination unit is configured to select, as the first ones of the user terminals, one or more of the user terminals for which the transmission timing of the uplink signal is not to be adjusted and to which no downlink signal other than the instruction information is to be transmitted.

3. The base station according to claim 2,
   wherein the processor executing the instructions further implements
     a radio network identifier setting unit configured to set a radio network identifier to be shared and used among the first ones of the user terminals receiving the instruction information, and
     a radio network identifier report unit configured to report the radio network identifier to the first ones of the user terminals; and
   wherein the instruction information transmission unit is configured to transmit control information to receive the instruction information using the radio network identifier.

4. The base station according to claim 3,
   wherein the radio network identifier report unit is configured to report the radio network identifier using a radio resource control message, and
   wherein the radio resource allocation unit is configured to allocate the instruction information to the radio resource to be shared and used by a user terminal receiving a response to the radio network identifier.

5. The base station according to claim 3,
   wherein the control information to receive the instruction information includes a process number.

6. The base station according to claim 1, wherein the processor executing the instructions further implements
   a radio resource setting unit configured to set a radio resource to transmit an acknowledge response or a negative acknowledge response in response to the instruction information for the user terminal receiving the instruction information; and
   a radio resource information reporting unit configured to report information indicating the radio resource set by the radio resource setting unit for the user terminal receiving the instruction information.

7. The base station according to claim 6,
   wherein the radio resource information reporting unit is configured to report information using a radio resource control message, the information indicating the radio resource set by the radio resource setting unit.

8. The base station according to claim 1,
   wherein the processor executing the instructions further implements
     a grouping unit configured to group a predetermined number of the first ones of the user terminals for which it has been determined, by the transmission timing adjustment determination unit, that the transmission timing of the uplink signal is not to be adjusted, and
   wherein the radio resource allocation unit is configured to allocate the instruction information to the radio resource shared and used for each of the groups grouped by the grouping unit.

9. The base station according to claim 8,
   wherein the grouping unit is configured to group the first ones of the user terminals based on at least one of received quality information and a moving speed reported from user terminals.

10. The base station according to claim 1,
    wherein the processor executing the instructions further implements
      a user terminal selection unit configured to select a user terminal corresponding to at least one of a user terminal included in the first ones of the user terminals and that corresponding user data are generated, a user terminal determined, by the transmission timing adjustment determination unit, that the transmission timing is to be adjusted, and a user terminal determined that a physical uplink control channel and a sounding reference signal are released, and
    wherein the radio resource allocation unit is configured to allocate instruction information to a radio resource shared and used by a user terminal included in the first ones of the user terminals and other than the user terminal selected by the user terminal selection unit.

11. The base station according to claim 10, wherein the processor executing the instructions further implements
    an instruction information reception stop instruction unit configured to transmit information including an instruction to stop receiving the instruction information to the user terminal selected by the user terminal selection unit.

12. A user terminal comprising:
a memory that stores instructions; and
a processor that executes the instructions stored in the memory to implement
an instruction information receiving unit configured to receive first instruction information provided to adjust a transmission timing of an uplink signal from a base station; and
a transmission timing adjustment unit configured to adjust the transmission timing of the uplink signal based on the instruction information received by the instruction information receiving unit,
wherein the instruction information receiving unit is configured to receive second instruction information based on a radio resource, the second instruction information indicating that the transmission timing of the uplink signal is not to be adjusted and that is to be transmitted to first ones of the user terminals that are determined, by the base station, that the transmission timing of the uplink signal is not to be adjusted, the radio resource being shared and used by the first ones of the user terminals.

13. The user terminal according to claim 12,
wherein the processor executing the instructions further implements
a radio network identifier receiving unit configured to receive a radio network identifier shared and used by user terminals receiving the second instruction information from the base station, and
wherein the instruction information receiving unit is configured to receive control information to receive the second instruction information by using the radio network identifier.

14. The user terminal according to claim 12, wherein
the processor executing the instructions further implements
a radio resource information receiving unit configured to receive information indicating a radio resource used to transmit an acknowledge response or a negative acknowledge response in response to the second instruction information from the base station; and
a response transmission unit configured to transmit the acknowledge response or the negative acknowledge response based on whether the second instruction information from the base station is received by the instruction information receiving unit and in accordance with the information indicating a radio resource received by the radio resource information receiving unit.

15. The user terminal according to claim 12,
wherein the instruction information receiving unit is configured to receive based on a process number included in control information to receive the second instruction information.

16. The user terminal according to claim 12,
wherein the instruction information receiving unit is configured to receive the first instruction information based on a process number included in control information to receive the second instruction information.

17. A communication method used in a base station, the communication method comprising:
determining whether to adjust a transmission timing of an uplink signal for each of user terminals;
allocating a radio resource for instruction information indicating that the transmission timing of the uplink signal is not to be adjusted and that is to be transmitted to first ones of the user terminals that are determined, by the determining, that the transmission timing of the uplink signal is not to be adjusted; and
transmitting the instruction information to the first ones of the user terminals by using the radio resource allocated by the allocating,
wherein, in the allocating, the instruction information is allocated to the radio resource shared and used by the first ones of the user terminals.

18. A communication method used in a user terminal, the communication method comprising:
receiving first instruction information from a base station, the first instruction information being provided to adjust a transmission timing of an uplink signal; and
adjusting the transmission timing of the uplink signal based on the first instruction information received by the receiving,
wherein, in the receiving step, second instruction information is received based on a radio resource, the second instruction information indicating that the transmission timing of the uplink signal is not to be adjusted and being received by first ones of the user terminals that are determined, by the base station, that the transmission timing of the uplink signal is not to be adjusted, and
wherein the radio resource is shared and used by the first ones of the user terminals.

\* \* \* \* \*